United States Patent
Kizhepat et al.

(10) Patent No.: US 7,774,374 B1
(45) Date of Patent: Aug. 10, 2010

(54) SWITCHING SYSTEMS AND METHODS USING WILDCARD SEARCHING

(75) Inventors: Govind Kizhepat, Los Altos Hills, CA (US); Min H. Teng, Los Altos, CA (US); Kenneth Y. Y. Choy, Castro Valley, CA (US)

(73) Assignee: QLogic Corporation, Aliso Viejo, CA (US)

( * ) Notice: Subject to any disclaimer, the term of this patent is extended or adjusted under 35 U.S.C. 154(b) by 397 days.

(21) Appl. No.: 11/617,716

(22) Filed: Dec. 28, 2006

Related U.S. Application Data

(62) Division of application No. 10/792,597, filed on Mar. 2, 2004.

(51) Int. Cl.
*G06F 7/00* (2006.01)
(52) U.S. Cl. .................. 707/800; 709/202
(58) Field of Classification Search ................ 707/100, 707/102, 10, 201, 205, 705, 706, 713, 769, 707/770, 793, 796, 800; 711/147, E12.072, 711/1, 2, 148, 52, 54, 55, 56; 710/5, 22, 710/52, 54, 100, 122, 55.56; 370/412, 429, 370/395.1; 709/213, 215, 202
See application file for complete search history.

(56) References Cited

U.S. PATENT DOCUMENTS

| | | | |
|---|---|---|---|
| 5,434,976 A * | 7/1995 | Tan et al. | 709/234 |
| 5,838,915 A | 11/1998 | Klausmeier et al. | |
| 5,995,967 A * | 11/1999 | Iacobovici et al. | 707/100 |
| 5,995,971 A * | 11/1999 | Douceur et al. | 707/102 |
| 6,487,202 B1 | 11/2002 | Klausmeier et al. | |
| 6,584,518 B1 | 6/2003 | Bass et al. | |
| 6,662,184 B1 * | 12/2003 | Friedberg | 707/100 |
| 6,748,594 B1 * | 6/2004 | Carey et al. | 719/316 |
| 6,961,808 B1 * | 11/2005 | Oren et al. | 711/108 |
| 7,031,902 B1 * | 4/2006 | Catiller | 703/24 |
| 2003/0126347 A1 * | 7/2003 | Tan et al. | 710/313 |
| 2007/0230493 A1 * | 10/2007 | Dravida et al. | 370/412 |

OTHER PUBLICATIONS

Office Action mailed Jan. 23, 2009 for U.S. Appl. No. 11/617,712, filed Dec. 28, 2006.

* cited by examiner

*Primary Examiner*—Greta L Robinson
(74) *Attorney, Agent, or Firm*—Law Office of Andrei D. Popovici, PC

(57) ABSTRACT

In some embodiments, a hardware linked-list manager includes a wildcard search controller for generating corresponding queue-specific read requests from wildcard read requests. The linked-list manager may be part of an on-chip interagent switch for allowing a plurality of agents to communicate with each other. The interagent switch may include a crossbar switch and a plurality of hardware linked-list managers integrated on the chip, connected to a random access memory, and connected to the crossbar switch such that the crossbar switch is capable of connecting each of the linked-list managers to each of the agents. Each linked-list manager sends agent-generated data to the memory for storage in the memory as a linked-list element, and retrieves linked-list elements from memory in response to agent read requests. A shared free-memory linked-list manager may maintain a linked list of free memory locations, and provide free memory address locations to a linked list manager upon request.

7 Claims, 13 Drawing Sheets

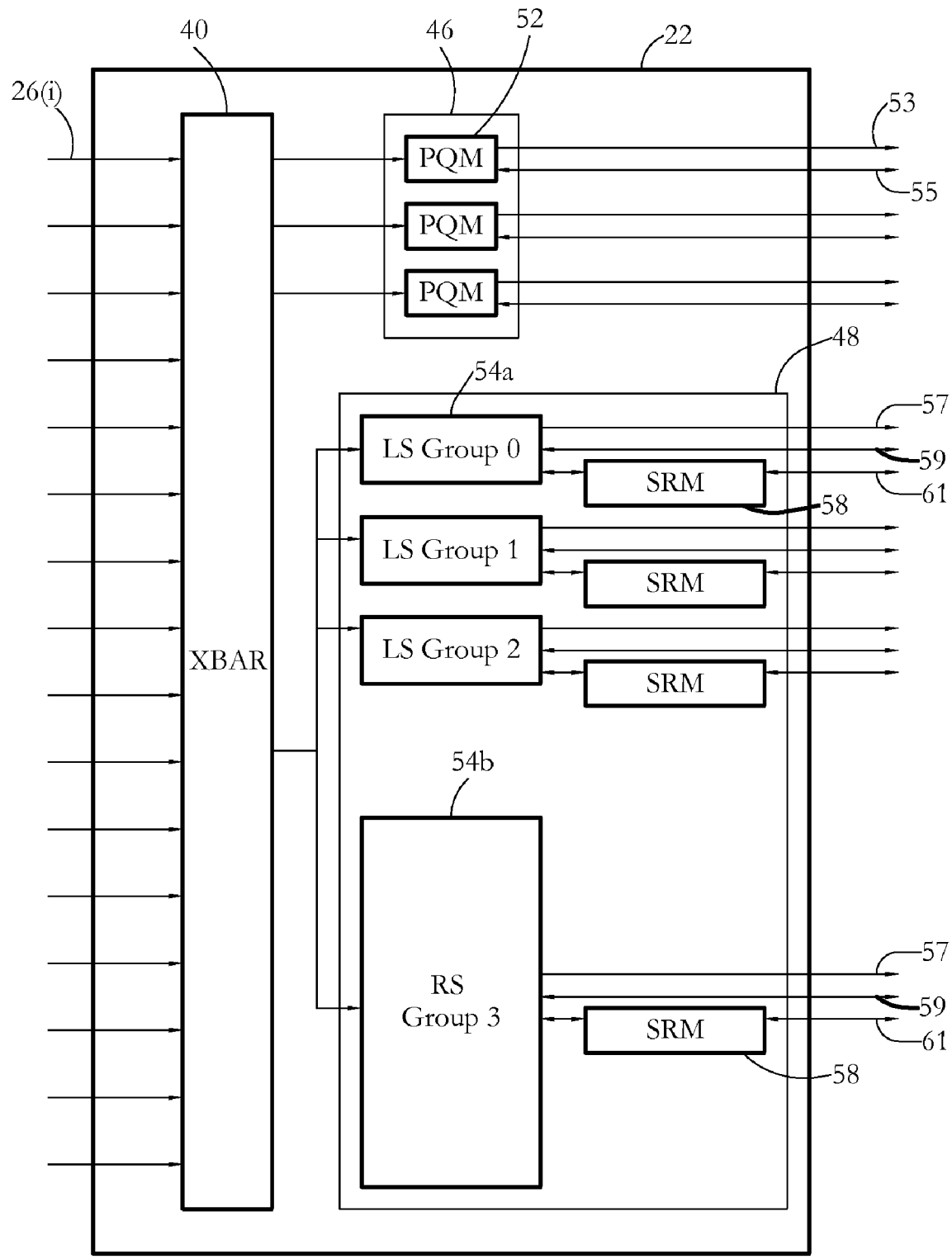
FIG. 2-A

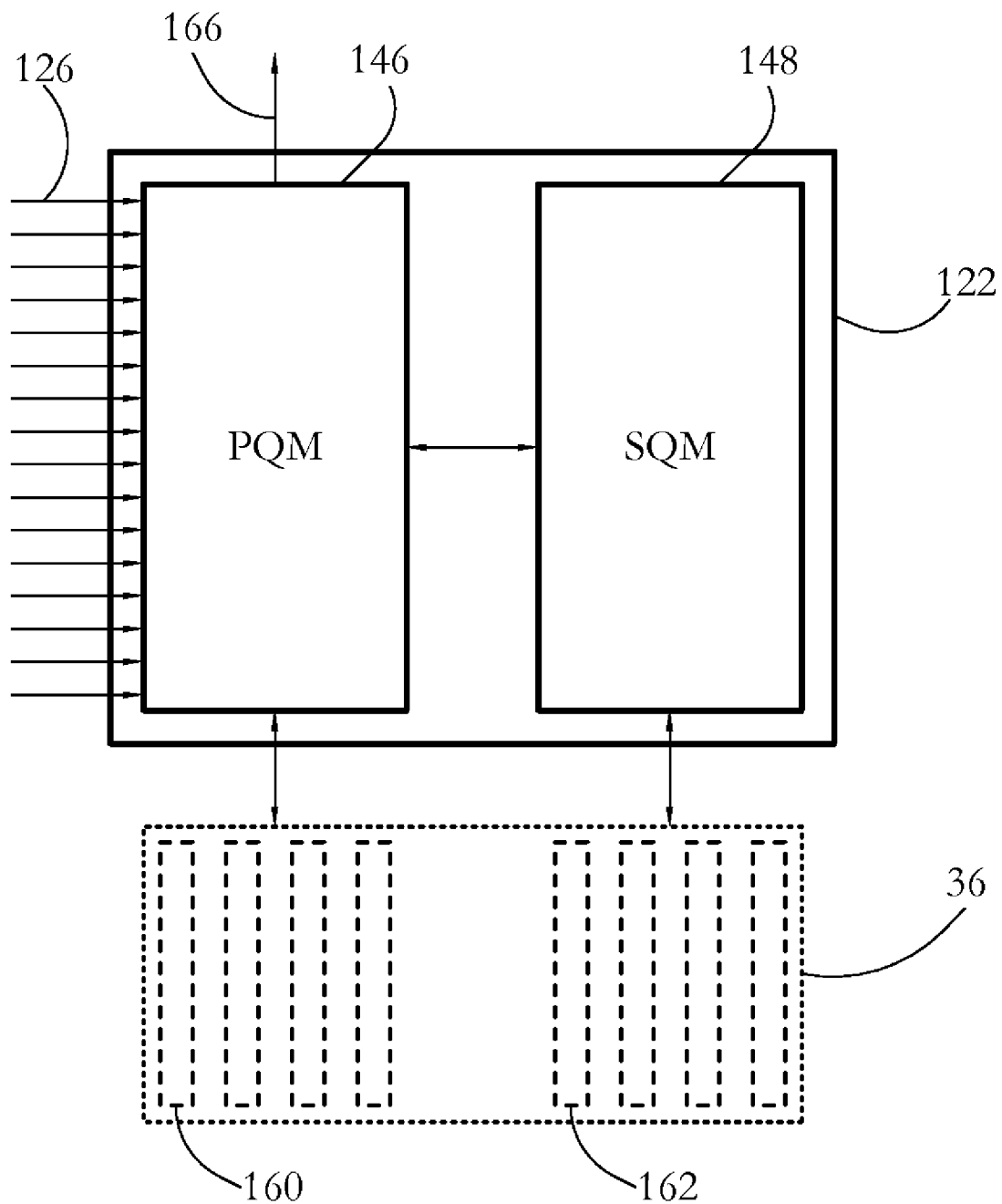
FIG. 2-B

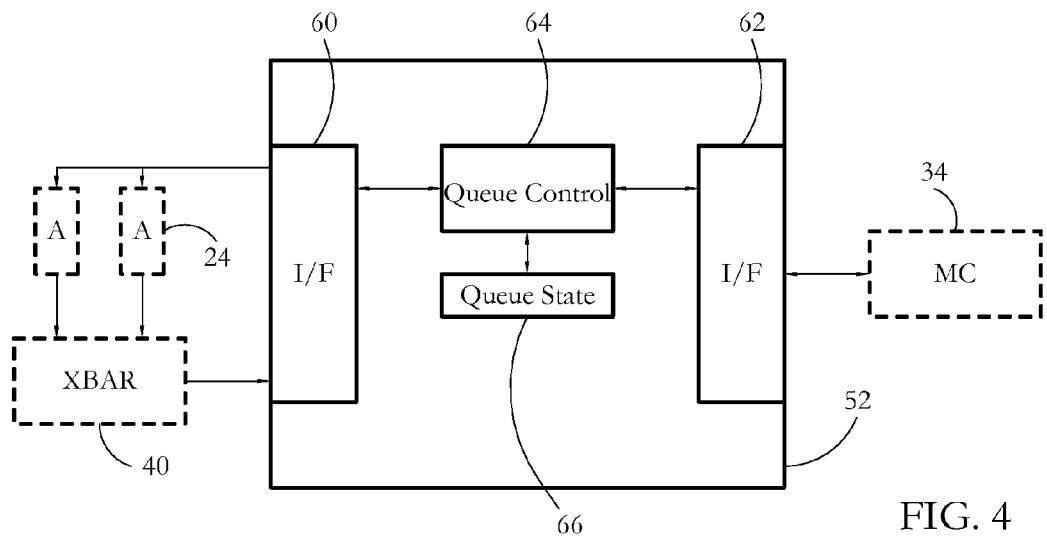
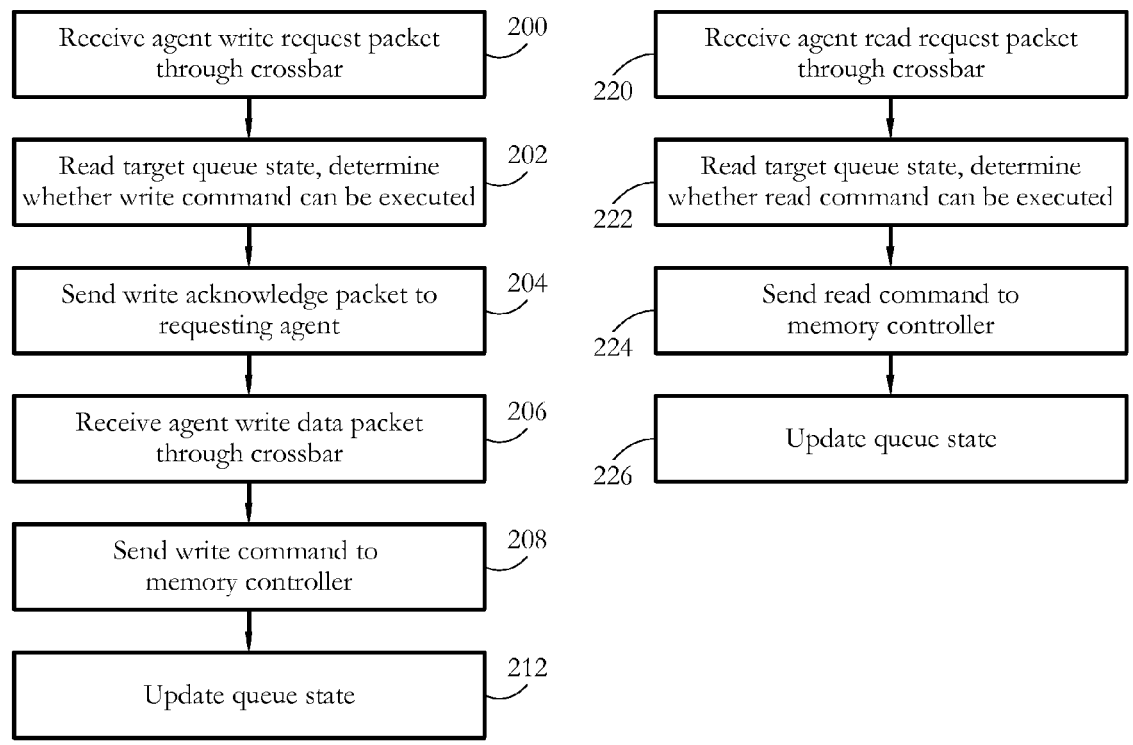
FIG. 5-A
FIG. 5-B

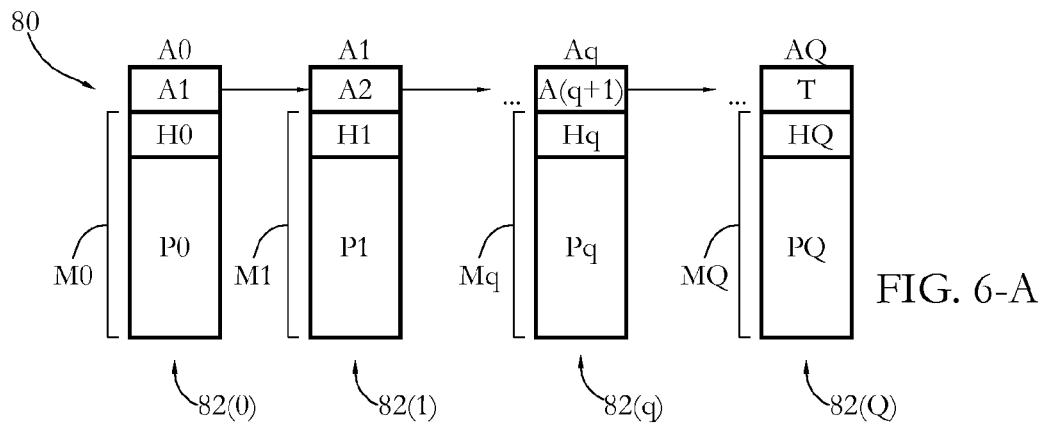
FIG. 6-A
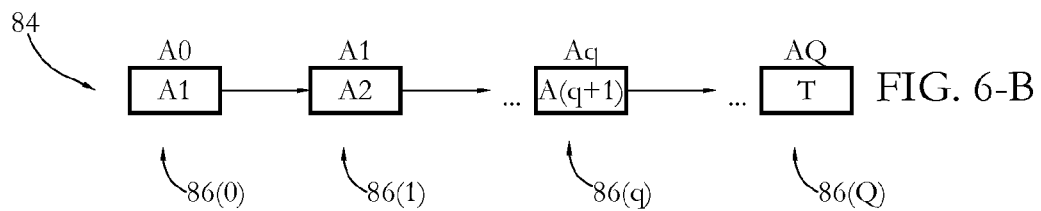
FIG. 6-B
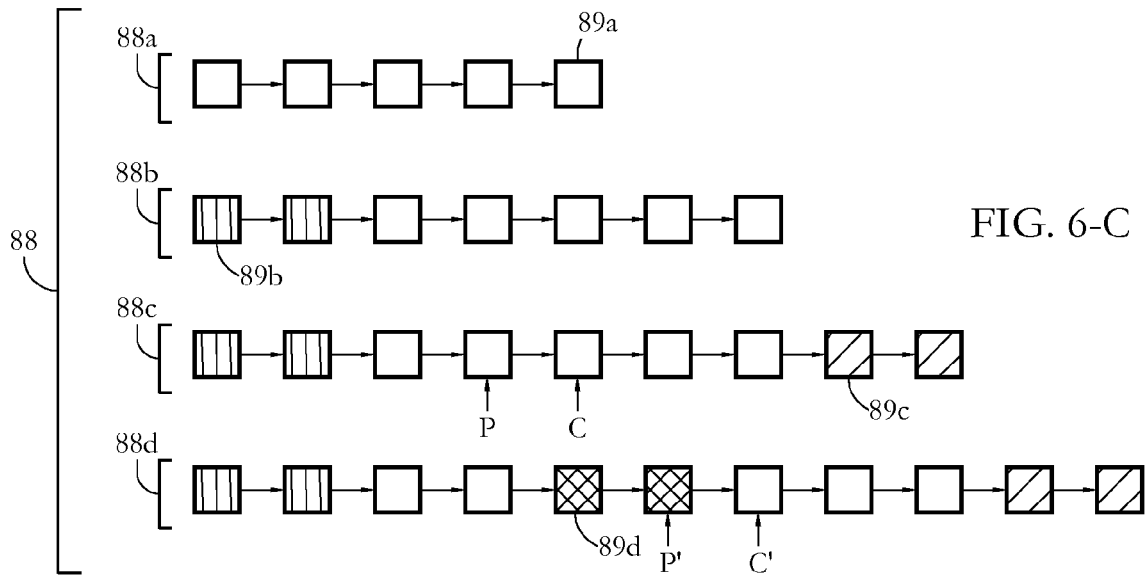
FIG. 6-C

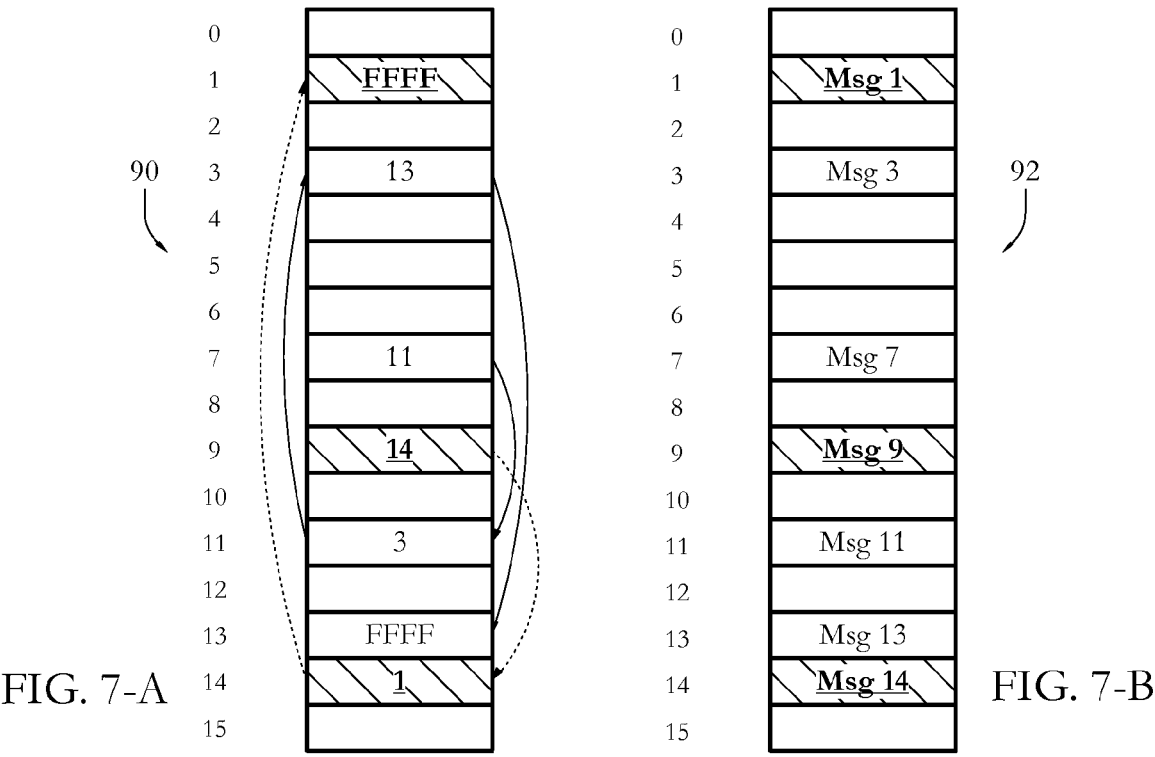
FIG. 7-A    FIG. 7-B
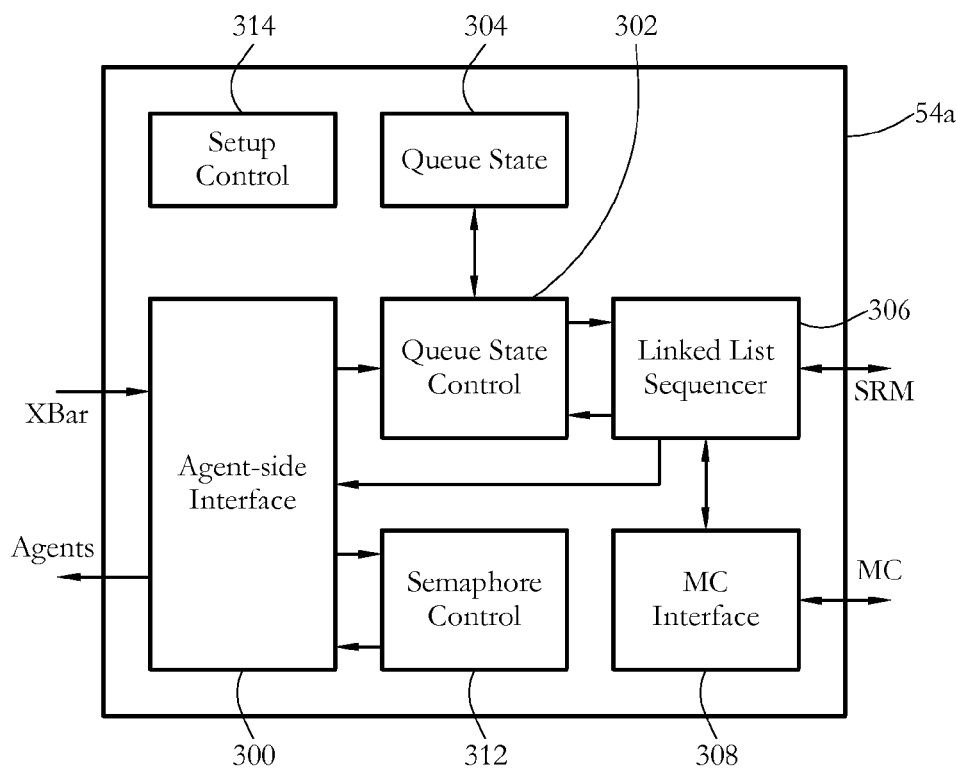
FIG. 8

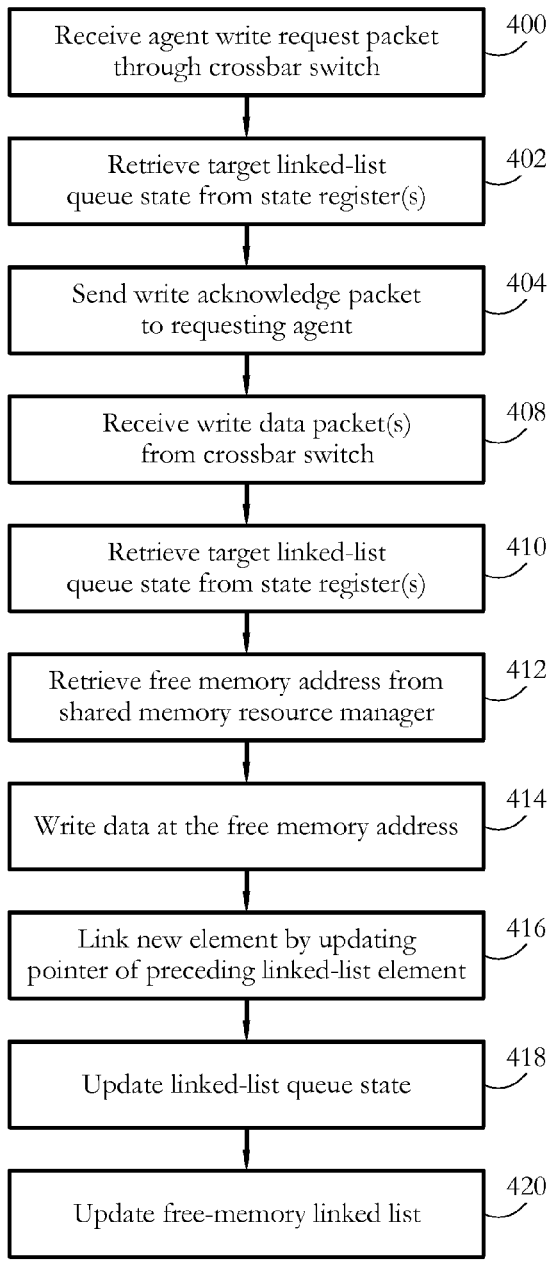
FIG. 9-A
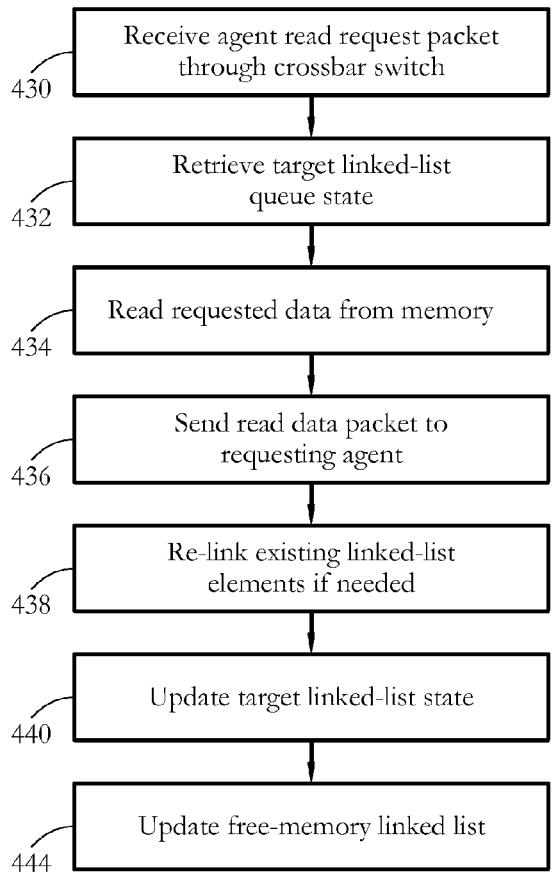
FIG. 9-B

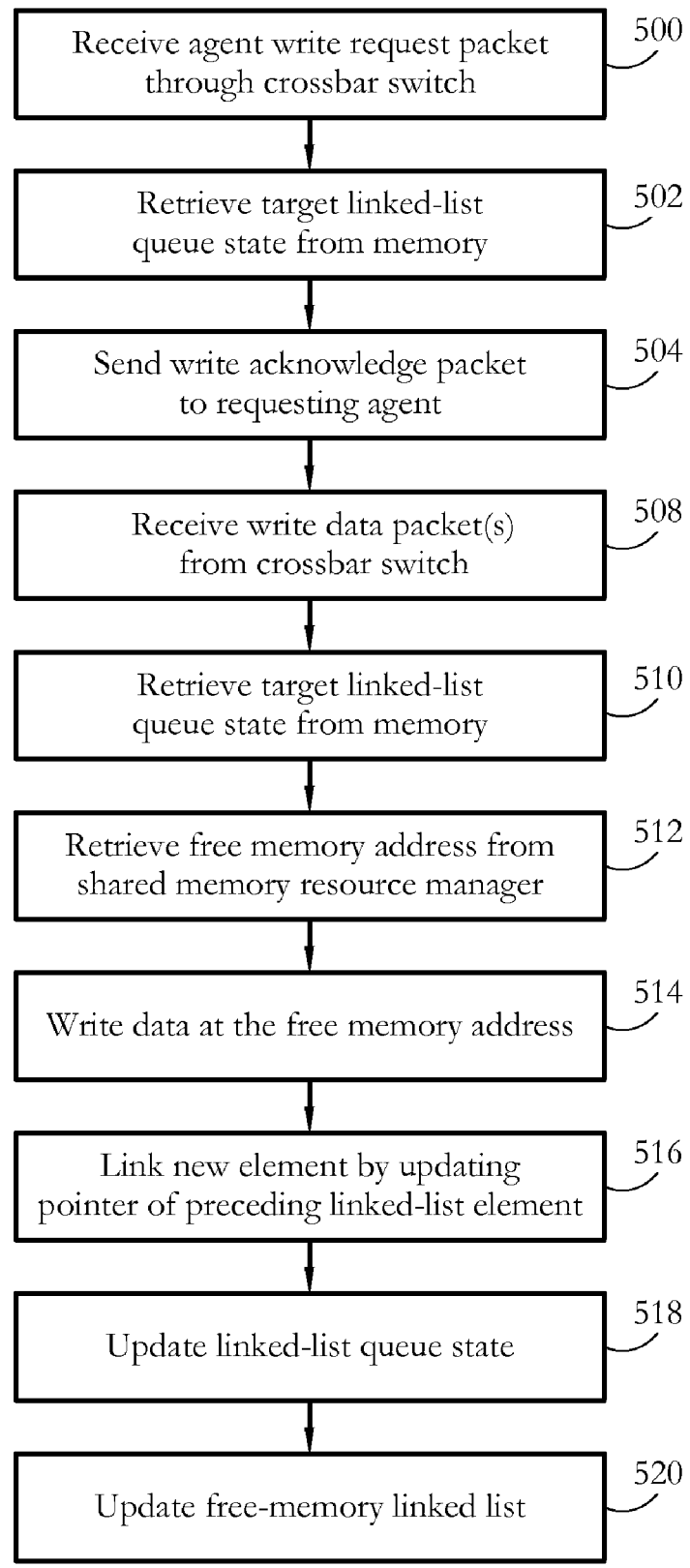
FIG. 11-A

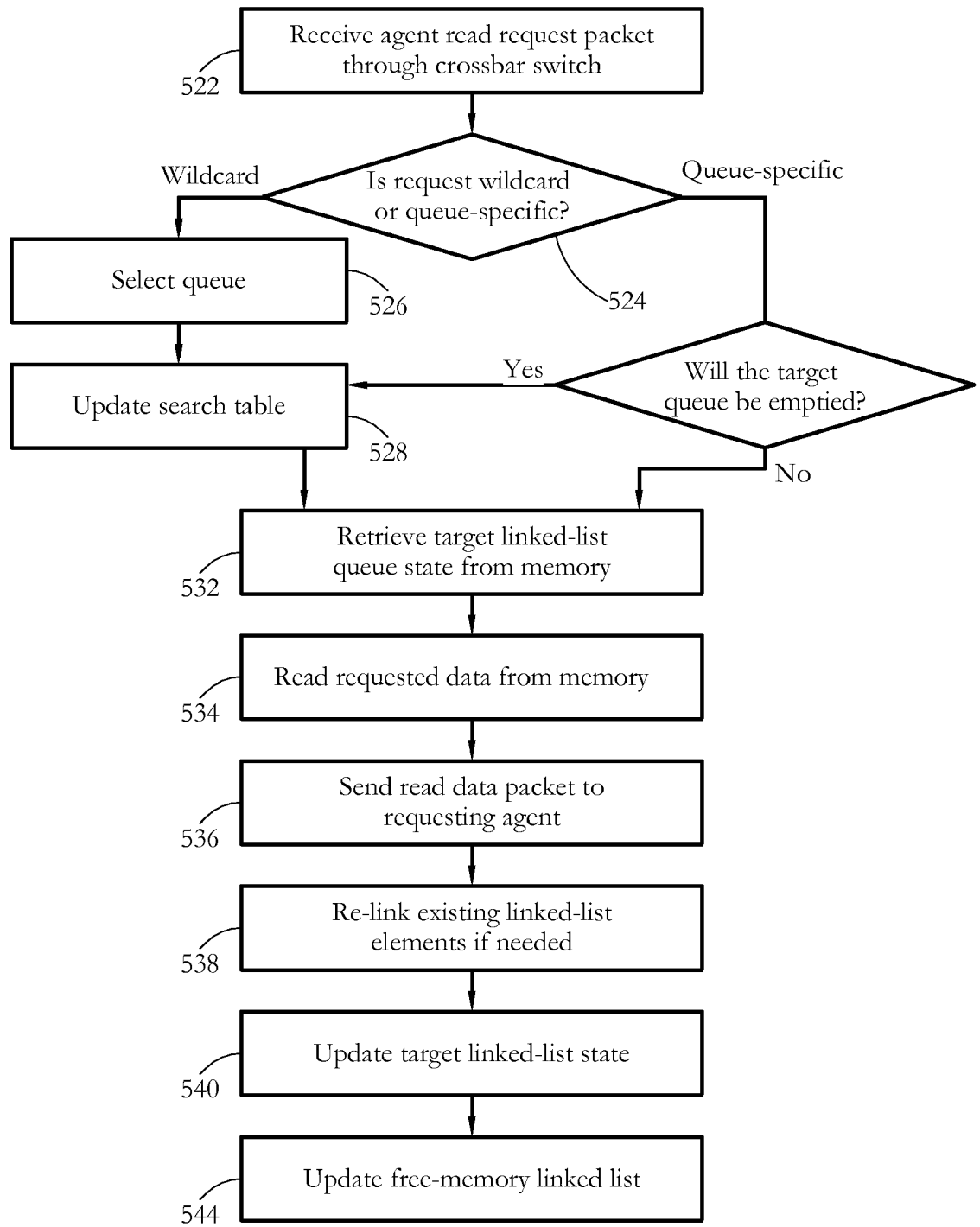
FIG. 11-B

SWITCHING SYSTEMS AND METHODS USING WILDCARD SEARCHING

RELATED APPLICATION DATA

This application is a divisional of U.S. patent application Ser. No. 10/792,597, filed Mar. 2, 2004, which is herein incorporated by reference, and is related to the U.S. patent application entitled "Switching Systems and Methods using Free Memory Linked List Management," first inventor Kizhepat, which is being concurrently filed with the present application and is herein incorporated by reference.

FIELD OF THE INVENTION

The invention in general relates to data processing systems, and in particular to systems and methods for communicating data between functional blocks of an integrated circuit.

BACKGROUND

Data processing systems such as application specific integrated circuits (ASICs) typically include multiple functional blocks (cores) that need to communicate with each other. In one interconnection approach, different functional blocks are interconnected directly through on-chip connections, for example through on-chip first-in-first-out (FIFO) buffers. In another interconnection approach, different functional blocks communicate through a shared external memory. A sender functional block writes data to a shared memory location, and a receiver functional block subsequently reads the data from that memory location.

SUMMARY OF THE INVENTION

According to one aspect, the present invention provides a data processing apparatus comprising: a plurality of agents including a first agent and a second agent; a crossbar switch integrated on a chip and connected to each of the plurality of agents; and a linked-list manager integrated on the chip. The linked-list manager is connected to the crossbar switch and to a random access memory. The crossbar switch is capable of connecting the linked-list manager to each of the plurality of agents. The linked-list manager controls a plurality of linked-list queues stored in the random access memory, and is configured to: en-queue first target data in a first target linked-list queue in response to receiving from the first agent a first write message, the first write message including the first target data and an identifier of the first target linked-list queue; de-queue the first target data from the first target linked-list queue in response to receiving from the second agent a first read request message, the first read request message including an identifier of the first target linked-list queue; and send to the second agent a first read reply message including the first target data.

In one embodiment, the linked-list manager comprises an agent-side interface configured to communicate with a plurality of agents including a first agent and a second agent; a memory-side interface configured to communicate with the random access memory through a random access memory controller; a linked-list state controller connected to the agent-side interface; and a linked-list sequencer connected to the linked-list state controller and the random access memory. The linked-list state controller is configured to: retrieve a first target linked-list queue state in response to receipt by the agent-side interface of a first memory access message sent by the first agent; send the first target linked-list queue state to the linked-list sequencer; and, after sending the first target linked-list queue state to the linked-list sequencer, updating the first target linked-list queue state. The linked-list sequencer is configured to: employ the first target linked-list state to generate a first set of memory access commands to en-queue first target data in the first target linked-list queue in response to receipt by the agent-side interface of a first write message sent by the first agent, the first write message including the first target data; employ the first target linked-list state to generate a second set of memory access commands to de-queue the first target data from the first target linked-list queue in response to receipt by the agent-side interface of a first read request message sent by the second agent, and, after de-queuing the first target data from the first target linked-list queue, sending the first target data to the agent-side interface for transmission to the second agent.

According to another aspect, the present invention provides a data processing system comprising: a linked-list queue manager controlling a plurality of linked-list queues stored in a random access memory; and a shared free memory linked-list manager connected to the linked-list queue manager and to the random access memory, the shared free memory linked-list manager controlling a linked-list of free memory locations assigned to the plurality of linked-list queues. The shared memory resource manager is configured to: de-queue a memory location from the linked-list of free memory locations, and send the free memory location to the linked-list queue manager in response to a de-queue request received from the linked-list queue manager, and en-queue a memory location to the linked-list of free memory locations in response to an en-queue request received from the linked-list queue manager.

According to yet another aspect, the linked-list manager may include a wildcard search controller for generating a queue-specific read request from a wildcard read request. The queue-specific read request comprises an identifier of a non-empty target queue selected from a segment comprising a plurality of queues. The wildcard search controller comprises a zoom-out search controller for generating a search target queue set identifier in response to receipt of the wildcard read request; and a zoom-in search controller connected to the zoom-out search controller, for receiving the search target queue set identifier and generating the identifier of the non-empty target queue by retrieving queue states for queues belonging to the search target queue set.

BRIEF DESCRIPTION OF THE DRAWINGS

The foregoing aspects and advantages of the present invention will become better understood upon reading the following detailed description and upon reference to the drawings where:

FIG. 2-A shows the internal structure of a queue management switch according to an embodiment of the present invention.

FIG. 2-B shows the internal structure of a queue management switch according to another embodiment of the present invention.

FIG. 4 illustrates schematically an exemplary internal structure of a primary (FIFO) queue manager according to an embodiment of the present invention.

FIG. 5-A-B show sequences of steps performed in primary queue write and read operations, respectively, according to an embodiment of the present invention.

FIG. 6-A-B illustrate exemplary data and pointer linked lists according to an embodiment of the present invention.

FIG. 6-C illustrates the addition of a two-pointer chain to the head, tail, and body of a linked-list, respectively, according to an embodiment of the present invention.

FIG. 7 illustrates the correspondence between a pointer pool and a message pool, according to an embodiment of the present invention.

FIG. 8 illustrates schematically an exemplary internal structure of a local-state secondary (linked-list) queue manager according to an embodiment of the present invention.

FIGS. 9-A and 9-B show sequences of steps of write and read operations, respectively, performed in a local-state secondary queue, according to an embodiment of the present invention.

FIGS. 11-A and 11-B show sequences of steps of write and read operations, respectively, performed in a remote-state secondary queue, according to an embodiment of the present invention.

DETAILED DESCRIPTION OF THE INVENTION

In the following description, it is understood that all recited connections between structures can be direct connections or indirect connections through intermediary structures. A memory access command may be a write or read command. A set of elements includes one or more elements. Any recitation of an element is understood to refer to at least one element. Unless otherwise specified, an identifier of an object may be the object itself, or information distinct from the object that identifies the object. Unless otherwise specified, the term "logic" refers to special-purpose hardware. Any sequence of steps may be, but need not necessarily be, performed in the order illustrated. Unless otherwise specified, the terms "address" and "location" includes physical memory addresses as well as indexes or identifiers of physical memory addresses. Thus, transferring a memory address or location between functional blocks may be achieved by communicating an identifier of a physical memory address. Any recited message may form part of a larger data structure. Thus, en-queuing a received message may include en-queuing only part of the received data that includes the message. Similarly, transmitting a de-queued message may include de-queuing a larger data structure, and transmitting only part of that data structure. Unless otherwise specified, de-queuing an element from a queue means retrieving the element and removing the element from the queue, while reading an element or peeking at an element need not include removing the element from the queue. Unless otherwise specified, the statement that logic is configured to perform a given act or function refers to the fact that the logic is in such a configuration, and is not limited to a particular way or time that the logic became so configured (i.e. during the design or manufacture of a circuit, or post-design/manufacture).

The following description illustrates embodiments of the invention by way of example and not necessarily by way of limitation.

Figure 1:
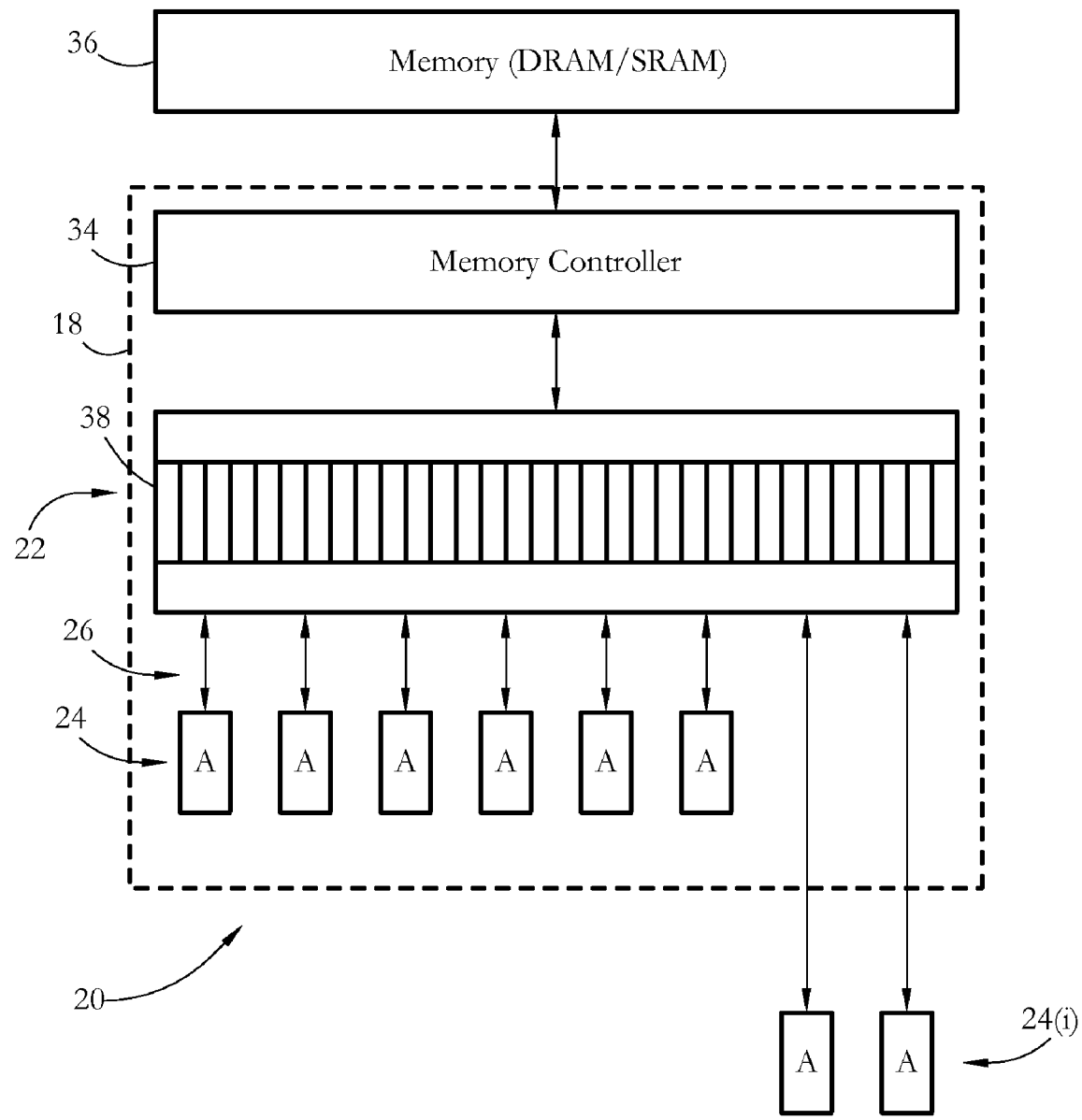
FIG. 1 is a schematic diagram of an exemplary data processing system according to an embodiment of the present invention.

FIG. 1 shows a schematic illustration of an exemplary integrated circuit system 20 according to an embodiment of the present invention. System 20 includes a plurality of agent functional blocks 24, an interagent-communication queue management switch 22, a memory controller 34, and a conventional off-chip memory 36. Queue management switch 22, some or all of agent functional blocks 24, and memory controller 34 are preferably integrated on a chip 18. Memory 36 is a random access memory (RAM) such as static random access memory (SRAM) or dynamic random access memory (DRAM). A suitable SRAM may include a quad data rate (QDR) SRAM. Examples of DRAM include synchronous dynamic random access memory (SDRAM) such as single-data rate (SDR) and double data rate (DDR) SDRAM. Queue-management switch 22 is connected to agent functional blocks (agents) 24 over a plurality of connections 26. Each connection 26 may include plural buses. In one embodiment, the connection from each agent 24 to queue management switch 22 is implemented over a unidirectional bus dedicated to a single agent, while the connections from management switch 22 to agents 24 are implemented over a common bus shared by multiple agents. Memory controller 34 is connected to queue-management switch 22 and memory 36. Queue-management switch 22 can be thought to define a plurality of access slots 38, each corresponding to a queue. Each slot 38 includes control logic for controlling operations performed on queue contents stored in memory 36.

The set of queues preferably includes a subset of primary (preallocated, FIFO) queues, and a subset of secondary (linked-list) queues. The primary queues are pre-allocated first-in-first-out (FIFO) queues. Each queue is allocated a memory space dedicated to that queue. Preferably, the primary queue contents (data) are stored in external memory 36, while the primary queue states are stored on-chip. The secondary queues are linked-list queues. Each secondary queue comprises a linked-list which may be defined in a distributed, non-contiguous memory space within memory 36. The set of linked-listed queues preferably includes a plurality of local-state linked-list queues, and a plurality of remote-state linked-list queues. For local-state queues, a queue state (e.g. head address, tail address, and length) is stored locally, on-chip. For remote-state queues, the queue state is stored in memory 36. The queue state includes at least the head of the queue and at least one of the queue tail and the queue length. In an exemplary implementation, queue-management switch 22 includes 48 primary queues, 48 local-state secondary queues, and 256 k remote-state secondary queues. The various primary queue and secondary queues may be organized in several groups, with each group corresponding to an assigned pool of contiguous memory addresses, as described in detail below.

Agents 24 may be any functional blocks that need to communicate with each other. In one implementation, at least some of the agent functional blocks 24 may be network packet processors capable of processing network data packets. Other agents may include programmable processors such as general-purpose processors. Agents 24 communicate with each other through queue-management switch 22. A first agent sends a data packet to queue-management switch 22. The data packet includes a target queue designation and associated data. Each queue may correspond to a given network connection or process. The various queues may be used to divide an aggregate workload into smaller parts to be processed by different processors/agents.

Queue-management switch 22 receives the data and places the data in the target queue. A second agent may request data by sending a specific queue request packet identifying a queue, or a wildcard request packet requesting data from any queue in a queue group or subset. Queue-management switch 22 retrieves the data and sends one or more response packets to the second agent. Each response packet may include an identification of the target (requesting) agent, and a payload of requested data.

In general, the connections between agents 24 and queue management switch 22 may be implemented using a variety of known protocols. In one embodiment, the connections between agents 24 and queue management switch 22 are implemented using a packet-based bus protocol as described in U.S. patent application Ser. No. 10/423,499, filed Apr. 25, 2003, entitled "On-Chip Packet-Based Interconnections using Repeaters/Routers," which is herein incorporated by reference. Each packet bus may include multiple fields (bit ranges) for transmitting different corresponding fields of packets. Packets sent from an agent 24 to queue management switch 22 may include a target queue tag, an opcode (operation code), and a payload, while packets sent from queue management switch 22 to agents 24 may include an agent tag, a queue tag, an opcode, and a payload.

Payloads include user data to be transferred between agents. Operation codes (opcodes) characterize the memory access operation corresponding to a packet. Exemplary opcodes for output (agent to controller) packets include NOP (no operation), WRITE DATA, READ MEMORY REQUEST, WRITE MEMORY REQUEST, and WRITE LAST DATA (transmitted data is the last data for a write transaction). Exemplary opcodes for input (controller to agent) packets include NOP, WRITE ACKNOWLEDGE (Ok to send data), READ ACKNOWLEDGE (different opcodes can signal whether data in payload is error-free or contains uncorrectable error), and READ LAST DATA (data in payload is the last data for a read transaction; different opcodes can signal the presence or absence of an error). The preceding description of packet fields is presented for illustrative purposes only.

FIG. 2-A shows the internal structure of queue-management switch 22 according to an embodiment of the present invention. Queue-management switch 22 comprises an N×M crossbar switch 40 connected on its input side to agent output buses 26. Queue management switch 40 is connected on its output side to a primary queue manager (PQM) 46, and a secondary (linked-list) queue manager (SQM) 48. Preferably, each queue manager 46, 48 is a multi-group queue manager. PQM 46 includes a plurality of single-group PQMs 52. SQM 48 includes a plurality of single-group local-state (LS) and remote-state (RS) SQMs 54a-b, respectively. In one embodiment, each single-group SQM 54a-b allows a single outstanding agent request at any given time.

Each SQM 54a-b is connected to a corresponding shared memory resource linked-list manager (SRM) 58. Each SRM 58 controls a linked-list of free memory spaces which can be transferred to/from the linked-list queues controlled by a corresponding SQM 54a or 54b. Preferably, to reduce system complexity, each SRM 58 is accessible only by the internal logic of its corresponding SQM 54a-b, and is not visible to the requesting agents. Each SRM 58 may service a single group of linked-list queues corresponding to one SQM 54a-b. In general, a single SRM 58 may also control multiple free-memory linked-lists, each allocated to a group of the linked-lists controlled by SQMs 54a-b, or a single free memory linked-list allocated to multiple groups. In an exemplary implementation, each PQM 52 controls 16 primary (FIFO) queues, each local-state SQM 54a controls 16 linked-list queues, and remote-state SQM 54b controls 256k linked-list queues organized in 4 segments of 64 k queues each.

PQM 46 controls a plurality of local-state, pre-allocated primary queues. Memory (buffer) space is pre-allocated individually for each primary queue. SQM 48 controls a plurality of linked-list, variable length queues. Memory (buffer) space is not pre-allocated individually for each secondary queue. As described below, memory space may be pre-allocated for a group or segment of secondary queues, and the maximum secondary queue length may be capped in order to prevent a single queue from taking up too large a share of common resources. Each queue manager 46, 48 directs en-queuing and de-queuing operations, manages queue states as queue elements are de-queued and en-queued, and returns status for operations resulting in exceptions (e.g. de-queue from an empty queue, en-queue to a full queue). Preferably, each local-state linked-list queue controlled by local-state SQM Ma is individually-configurable as a pointer queue or a data (message) queue, while individual segments of remote-state linked-list queues controlled by remote-state SQM 54b are configurable as pointer-queue or message queue segments. Pointer queues and message queues are described in detail below.

SQM 48 may support a semaphore for each secondary queue, to facilitate queue lock implementation. SQM 48 may also allow wildcard searching for read operations. For wildcard searching, scheduling logic selects a secondary queue to read from, in response to a wildcard read request. A wildcard read request identifies only a group or segment of queues to be searched, and not an individual target queue.

In the embodiment shown in FIG. 2-A, each primary queue manager 52 is connected to crossbar switch 40 over a dedicated connection, while secondary queue managers 54a-b are connected to crossbar switch 40 over a time-multiplexed, common physical connection. Each primary queue manager 52 is connected to agents 24 and to system memory controller 34 (shown in FIG. 1) over corresponding connections 53, 55, respectively. Each secondary queue manager 54a-b is connected to the system agents and the system memory controller over corresponding connections 57, 59, respectively. Each SRM 58 is connected to the system memory controller over a corresponding connection 61.

FIG. 2-B shows the internal structure of a queue management switch 122 according to another embodiment of the present invention. Queue management switch 122 includes a primary queue manager 146 and a secondary queue manager 148. Each queue manager 146, 148 may include a plurality of queue managers (primary, local-state secondary, and/or remote-state secondary queue managers), as described above. Secondary queue manager 148 is connected to a plurality of requesting agents through primary queue manager 146. Queue management switch 122 is connected to the requesting agents over a plurality of input buses 126 and a queue output bus 166. Queue managers 146, 148 are further connected to external memory 36. A set of primary queues 160 and secondary queues 162 are stored in external memory 36. In the embodiment shown in FIG. 2-B, primary queue manager 146 relays requests and replies between requesting agents and secondary queue manager 148.

Figure 3:
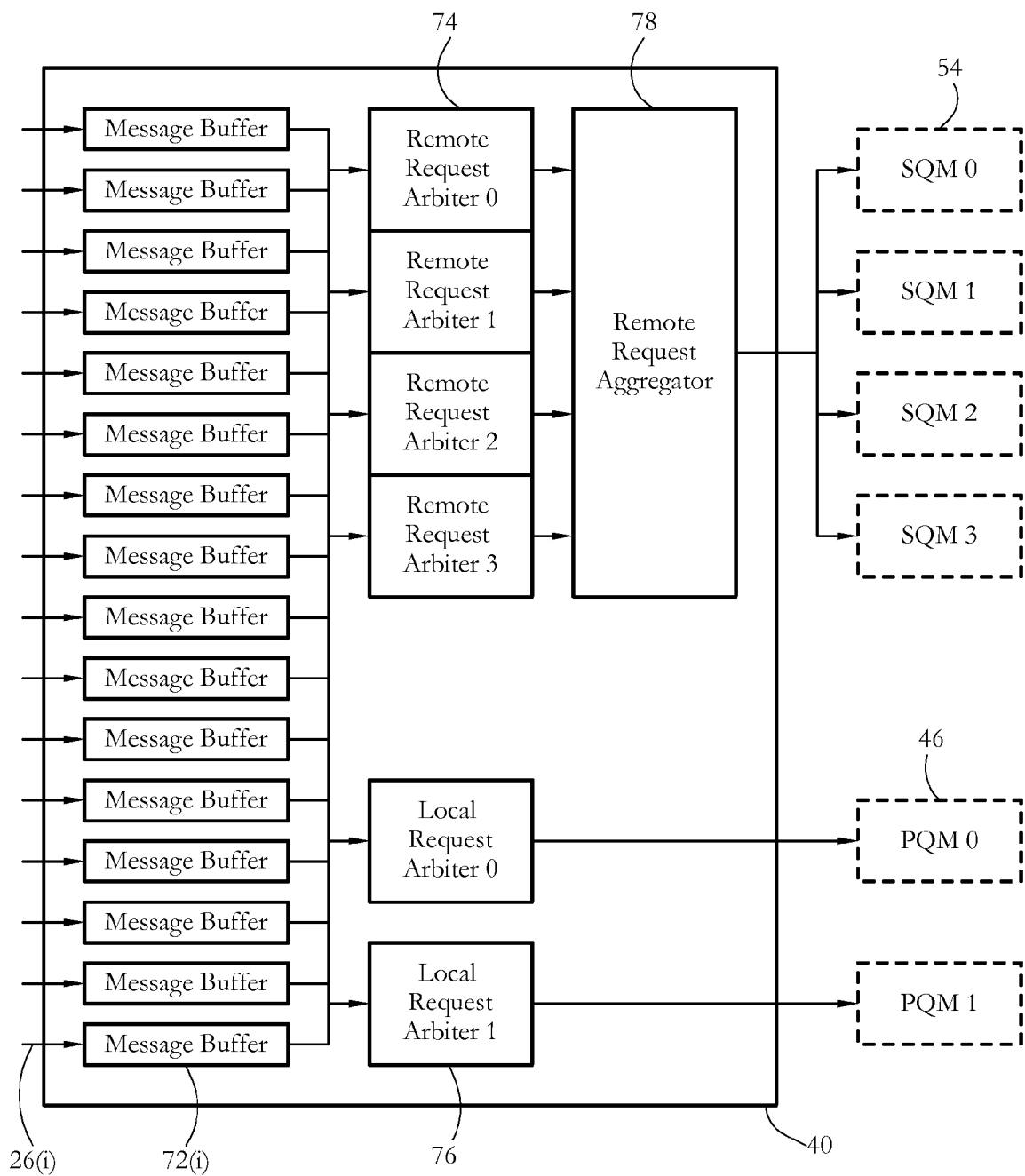
FIG. 3 illustrates the internal structure of a crossbar switch according to an embodiment of the present invention.

FIG. 3 shows a diagram of a crossbar switch 40 according to an embodiment of the present invention. Crossbar switch 40 includes a plurality of input message buffers 72(i), each connected to a corresponding input bus 26(i). Input message buffers 72(i) serve to buffer input message packets received from requesting agents. The outputs of message buffers 72(i) are commonly connected to a set of remote request arbiters 74 and a set of local request arbiters 76. The output of each local request arbiter 76 is connected to a corresponding single-group PQM 46. The outputs of remote request arbiters 74 are connected to a remote request aggregator 78, whose output is in turn commonly connected to SQMs 54. Each SQM 54 may be a local-state SQM or a remote-state SQM, as described above.

All agent requests received by input message buffers 72(*i*) are transmitted to all request arbiters 74, 76. Each request arbiter 74, 76 receives all agent requests, selects the requests directed to a queue manager corresponding to the arbiter, arbitrates the selected requests, and transmits one selected agent request at a time to corresponding PQMs 46 or remote request aggregator 78. Each local request arbiter 76 allows access to its corresponding PQM 46 by a single input buffer 72(*i*) at a time. Each remote request arbiter 74 allows access to its corresponding SQM 54 by a single input buffer 72(*i*) at a time. Remote request aggregator 78 time-multiplexes the remote requests selected by the various remote request arbiters 74 onto a single bus. Remote request aggregator 78 allows a reduction in the physical wiring required to connect crossbar switch 40 to SQMs 54.

Crossbar switch configurations other than the one shown in FIG. 3 may be employed in a queue management switch. For example, an N×M crossbar switch may include physical N×M (any to any) connections between inputs and outputs. An N×M crossbar switch may also include a single input and a single output physical connection, and time multiplexing logic for connecting to multiple agents at the input and/or output. Crossbar switches suitable for use in a queue management switch of the present invention are known in the art.

FIG. 4 shows a schematic diagram of a PQM 52 according to an embodiment of the present invention. PQM 52 includes an agent-side interface 60 connected to crossbar switch 40 and agents 24, a memory-side interface 62 connected to memory controller 34, queue control logic (a queue controller) 64 connected to interfaces 60, 62, and on-chip queue state storage such as one or more queue state registers 66 connected to queue control logic 64. Queue control logic 64 may include additional registers. Queue state registers 66 stores, for each queue in the groups of queues controlled by PQM 52: a base memory address, a queue head address, a queue tail address, and a queue length (number of elements in the queue). The head and tail addresses are preferably relative addresses defined with respect to the base memory address. The base memory address may be identical for all queues in the group controlled by PQM 52.

FIG. 5-A illustrates a series of steps performed by PQM 52 in a write operation, according to an embodiment of the present invention. In a step 200, agent-side interface 60 receives an agent write request from crossbar switch 40, and sends the request to queue control logic 64. The write request packet includes an identifier of the target primary queue, including an identifier of the group containing the target queue. Queue control logic 64 reads the target queue state from queue state registers 66, and determines whether the write command requested by the agent can be executed (step 202). If the target queue is full, the write command cannot be executed until a queue element has been de-queued, and an error message is sent to the requesting agent through agent-side interface 60. If the target queue can accept an additional queue element, queue control logic 64 sends a write acknowledge packet to the requesting agent 24 through agent-side interface 60 (step 204). Queue control logic 64 does not send any other write acknowledge packets or execute any other write commands until its current write command finishes execution, although subsequent write request packets may be buffered within agent-side interface 60. After receiving the write acknowledge packet, the requesting agent sends one or more write data packets to PQM 52 through crossbar switch 40. Each write data packet includes an identifier of the target primary queue, and a payload of data to be written. Queue control logic 64 receives the write data packets from agent-side interface 60, and transmits the data to be written to memory controller 34 through memory-side interface 62 (step 208). In a step 210, queue control logic 64 updates the queue state stored in queue state registers 66. Once the last write data packet of a write command has been received, queue control logic 64 becomes free to execute subsequent write commands.

FIG. 5-B illustrates a series of steps performed by PQM 52 in a read operation, according to an embodiment of the present invention. In a step 220, agent-side interface 60 receives an agent read request packet from crossbar switch 40, and sends a read request to queue control logic 64. The read request includes an identifier of the target primary queue. Queue control logic 64 reads the target queue state from queue state registers 66, and determines whether the read command requested by the agent can be executed (step 222). If the target queue is empty, the read command cannot be executed until a queue element has been en-queued, and an error message is sent to the requesting agent through agent-side interface 60. If the target queue is not empty, queue control logic 64 sends a read command to memory controller 34 through memory-side interface 62 (step 224), and updates the queue state stored in queue state registers 66.

The structure and operation of queue management switch 22 and secondary (linked-list) queue managers 54 (shown in FIG. 2-A) may be better understood by first considering a linked list 80 shown in FIG. 6-A. Linked list 80 comprises a plurality of linked list elements 82($q$), $q=0 \ldots Q$, $Q>0$, each stored in a memory space associated with a memory address Aq. For example, a first linked-list element 82(0) is stored at an address A0. The notation A0 may represent a physical memory address, or an index identifying a memory address. The first element 82(0) is commonly called the linked list head, while a last element 82(Q) is called the linked list tail. Each element 82($q$) may include a message (data) part Mq, and a pointer (address) part A(q+1). A message part Mq may include a header part Hq, and a payload part Pq. The header part Hq may include destination queue information, used by the corresponding SQM to direct the corresponding message to a designated destination queue. The payload part Pq encapsulates user information. In an exemplary implementation, each message part Mq may contain 64 bytes of data (e.g. 8-byte header and a 56-byte payload), while each pointer part A(q+1) contains an 8-byte pointer (address).

Queue 80 may have a variable length. Agents may write (en-queue) or read (de-queue) elements from queue 80. The number of elements that can be added to a queue may be capped at a pre-defined queue-dependent maximum queue length, in order to prevent a queue from dominating available memory resources. In general, elements may be added to and removed from linked list 80 at the head, tail, or intermediate positions. In an exemplary implementation, elements are added at the tail and removed from the head.

A state of linked-list queue 80 may be defined by the addresses of its head element 82(0) and tail element 82(Q), a linked list length (element count) Q+1, and a maximum queue length. As queue elements are en-queued and de-queued, the queue state is updated by the corresponding SQM. In an exemplary implementation, the queue head and tail are 24-bit values, while the queue length and maximum queue length are 16-bit values. Two additional parameters may be defined for each linked-list queue 80, in order to facilitate extended queue operations, described in detail below: an extended-operation current auxiliary pointer, and an extended-operation previous auxiliary pointer. In an exemplary implementation, the extended operation pointers are 24-bit values. Extended operations are operations performed within the queue body. The extended operation pointers serve as temporary identifiers of addresses of selected internal queue elements.

A pointer part A(q+1) of an element 82($q$) contains the address of the immediately subsequent linked list element 82($q$+1). For example, the linked list head 82(0) contains a pointer part A1 designating the memory address of the linked list element 82(1). The addresses of consecutive elements 82($q$), 82($q$+1) need not be, and generally are not, consecutive or monotonously increasing in the memory used to store the elements. The tail element 82(Q) may include a pointer part T which does not point to any subsequent linked-list element.

Each SQM 54*a-b* is preferably capable of supporting two types of queues: pointer queues and message queues. Any given queue may be configured as either a pointer queue or message queue. Each queue contains only one element type: either pointers or messages. The exemplary queue illustrated in FIG. 6-A is a message queue. Pointer queues include only pointers, without associated user data. FIG. 6-B illustrates schematically a pointer linked-list queue 84, which includes a plurality of pointer elements 86($q$), q=0 . . . Q, Q>0, each stored in a memory space associated with a memory address Aq. Each pointer element 86($q$) stores an address A(q+1) of the next linked-list pointer 86($q$+1).

In one embodiment, for message queues, each en-queue/de-queue message sent to/from the requesting agent includes a header and a payload of user data. The entire transmitted message or part of the transmitted message may be en-queued. For pointer queues, each en-queue/de-queue message sent or received by the queue manager contains a header, and a payload comprising an identifier of a single pointer or a pointer chain. For a pointer queue, a single en-queue or de-queue command may generally operate on a single pointer or on a linked-list of pointers (pointer chain). The pointer chain identifier may include a head pointer, a tail pointer, and a length of the pointer chain to be en-queued/de-queued. In one implementation, each en-queue command en-queues a pointer chain or a single pointer, while each de-queue command de-queues a single pointer.

Each element of a pointer queue may correspond implicitly to some memory area. That memory area may, but need not be, used to store messages by an SQM Ma-b. The memory area corresponding to a queue element may vary between pointer queues. For example, a first pointer queue may have each element corresponding to a 1 kB memory block, while a second queue may have each element corresponding to a 16 kB memory block. In one embodiment, pointer queues may be used to flexibly allocate memory space to different secondary queue managers or operating system processes. Consider a pointer queue corresponding to an operating system process. The memory space allocated to that process may be controlled by en-queuing and de-queuing elements from the pointer queue corresponding to the processes.

Similarly, memory space allocated to a message queue may be controlled through a pointer queue. The free memory address linked-list controlled by SRM 58 (shown in FIG. 2-A) may be such a pointer queue. A secondary queue-manager requestor (SQM 54*a-b*) de-queues an element from the free memory address linked-list maintained by SRM 58 to obtain a pointer to a free memory block, and en-queues a released pointer to return a memory block to the free memory pool. A de-queued free memory block and its associated pointer are used by the requestor SQM Ma-b to en-queue a corresponding message queue element.

Each SQM Ma-b is capable of performing a number of operations on each of its linked-list queues. The operations preferably include en-queue, de-queue, step-N-elements-and-peek, semaphore operations, and a wildcard read search operation. In a step-N-elements-and-peek operation, linked-list pointers are sequentially retrieved until the address of an internal linked-list element is ascertained. An extended operation auxiliary pointer is then set to point to the internal linked-list element. Semaphore operations are used to flag or lock particular queues. In wildcard search operations, a queue-specific read request is generated from a wildcard read request received from an agent. A wildcard search request designates a group or segment containing multiple queues, but does not designate an individual queue within that group or segment.

FIG. 6-C illustrates potential en-queue, de-queue and step-and-peek operations for an exemplary pointer queue 88. Corresponding operations for message queues are similar to those shown in FIG. 6-C, except that a single queue element is preferably en-queued/de-queued to/from a message queue in one operation. Four consecutive configurations of pointer queue 88 are shown: an initial configuration 88*a*, a second configuration 88*b* resulting after the addition of a chain of two pointers (2-pointer chain) 89*b* to the queue head, a third configuration 88*c* resulting after the subsequent addition of a 2-pointer chain 89*c* to the queue tail, and a fourth configuration 88*d* resulting after the subsequent addition of a 2-pointer chain 89*d* in the queue body. Before the addition of the pointer chain 89*d*, the previous and current extended operation pointers P, C of queue 88 point to two consecutive queue elements between which the pointer chain 89*d* is to be inserted. The previous extended operation pointer P points to the queue element immediately preceding the current extended operation pointer C. After the addition of pointer chain 89*d*, previous and current extended operation pointers P', C' point to the last element of the added chain 89*d* and the immediately subsequent queue element, respectively. Shifts in the current and previous extended operation pointers also result from execution of step-and-peek commands, as described below.

In an en-queue operation, an incoming message is added to a target queue. For pointer queues, the pointer chain identified in the en-queue message payload is en-queued, and the target queue length is incremented by the incoming chain length. For message queues, the entire received message is en-queued, and the queue length is incremented by one. The en-queue message may specify whether data is to be en-queued at the linked-list tail, head, or at a specified position within the linked-list body.

If a new element is added to the tail of a message queue, the pointer of the existing queue tail element is modified to point to the new tail address, the queue state is updated to reflect the new tail address and queue length, and the new element data is stored at the memory address corresponding to the new tail. If a new pointer chain is added to the tail of a pointer queue, the pointer of the existing queue tail element is modified to point to the head of the incoming pointer chain, and the queue state is updated to reflect the new tail address and queue length. If a new element is added at the head of a message queue, the new element's pointer is set to point to the original queue head, the queue state is updated to reflect the new head address and queue length, and the element data is stored at the memory address corresponding to the new head. If a new pointer chain is added at the head of a pointer queue, the last pointer in the pointer chain is set to point to the original queue head, and the queue state is updated to reflect the new head address and queue length.

If a new element or chain is to be added to the body of a data or pointer queue, the previous and current extended operation pointers for that queue are advanced along the linked-list, if needed, until the two pointers flank the insertion location. Advancing the pointers may include sequentially retrieving pointer values from memory, starting from the current extended pointer locations or from the head of the queue if needed, until the memory locations of the desired linked-list positions are determined. For a message queue, the pointer of the immediately preceding element in the queue (the element pointed to by the extended operation pointer P) is modified to point to the new element's address, the pointer of the newly-added element is set to point to the immediately-subsequent element (the element pointed to by the extended operation pointer C), the queue state is updated to reflect the new queue length, the new element data is stored at the corresponding memory address, and the previous extended operation pointer P is set to point to the newly added element. For a pointer chain, the immediately preceding queue pointer is modified to point to the first element in the pointer chain, the last pointer in the pointer chain is set to point to the immediately subsequent queue pointer, the queue state is updated to reflect the new queue length, and the previous extended operation pointer is set to point to the last element in the pointer chain. In FIG. 6-A, the extended operation pointers before the chain of two pointers 89$d$ is added to queue 88 are illustrated at P, C, while the extended operation pointers after the chain of two pointers 89$d$ is added to queue 88 are illustrated at P', C'.

In a de-queue operation, a requested message is removed from a target queue and sent back to the requesting agent. For pointer messages, a message header is attached to each de-queued pointer before transmission to the requesting agent. For data messages, the de-queued message may be transmitted verbatim to the requesting agent. In one embodiment, a single queue element is removed in one de-queue operation for both pointer queues and message queues. The target queue length is then decremented by one, to reflect the removal of the queue element, and the memory space taken up by the de-queued element is returned to the free memory pool. The de-queue message may specify whether data is to be de-queued from the linked-list tail, head, or from a specified position within the linked-list body.

If an element is de-queued from the head of a queue, the queue state is updated to reflect the new head address and queue length. If an element is de-queued from the queue tail, the pointer of the new queue tail is set to a tail value, and the queue state is updated to reflect the new tail address and queue length. If a new element is de-queued from the body of a queue, the previous and current extended operation pointers for that queue are advanced along the linked-list, if needed, until the current extended operation pointer points to the element to be de-queued. After the element is de-queued, the queue state is updated to reflect the new queue length, and the pointer of the preceding element and the current extended operation pointer are set to be equal to the pointer of the retrieved element (equal to the address of the element following the retrieved element).

In a step-N-and-peek operation, the current and previous extended operation pointers are advanced along the linked-list from the head of the queue to the Nth element, and the pointer value of the Nth element is returned to the requestor, without de-queuing. The step-N-and-peek operation can be used to position the extended operation pointers at a desired position along the linked-list. On initialization, the current extended operation pointer points to the queue head. As described above, the previous extended operation pointer trails the current pointer by one element. If the step N is longer than the queue length, the stepping process ends at the queue tail.

Semaphore operations include setting and clearing a semaphore indicator for an individual queue or multiple queues (e.g. a group or segment). The semaphore indicator may be an advisory, single-bit indicator of queue status as claimed or unclaimed. In one embodiment, supported semaphore operations include clear (unlock), and test-and-set (lock). Semaphore control logic 312 (shown in FIGS. 8 and 10) stores the identity of the current semaphore owner until the semaphore is cleared. In each operation, the current semaphore status (claimed/unclaimed) and the current semaphore owner (if any) are returned to the requestor. A hard lock scheme may be implemented by having each requestor perform a test-and-set operation before accessing a given queue. In one embodiment, each local-state secondary queue has an associated per-queue semaphore bit, while each remote-state secondary queue is associated with a per-segment semaphore bit and a per-queue semaphore bit. The per-queue semaphore bit for remote-state secondary queues may be made accessible only for wildcard (non-queue-specific) read requests. For such a wildcard read request, the test-and-set operation may become a search-and-set operation.

The pointer and data components of a linked-list element need not be stored in contiguous memory locations, or even in the same type of memory. In an exemplary implementation, the pointer parts of a group of linked-list queues are stored in a pointer table, while the corresponding data parts are stored in a corresponding message (data) buffer pool. The pointer table and the message buffer pool may be stored in different parts of DRAM or SRAM. In one embodiment, the pointer table is stored in QDR SRAM, and the message buffer pool in DDR DRAM. For queue groups including both pointer and message queues, two separate pointer tables may be used for the pointer queues and message queues.

FIG. 7-A shows schematically an exemplary 16-element pointer table 90, while FIG. 7-B shows a corresponding 16-element message buffer pool 92. Pointer table 90 and message buffer pool 92 are each defined in contiguous memory spaces. Each pointer table entry, identified in FIG. 7-A by an index [0:15], preferably occupies a memory access space equal to the native memory access granularity, for example 8 bytes. The relative memory address of each pointer table entry is then the entry index multiplied by 8. A pointer and its corresponding data within message buffer pool 92 have the same index. Thus, the correspondence between pointers and message data may be established implicitly, by a given relationship between memory addresses implemented by queue management switch 22.

Pointer table 90 and message buffer pool 92 may be shared by multiple linked-list queues, with each table entry belonging to a single queue. The pointer table 90 shown in FIG. 7-A includes pointers for two linked-list queues: a first queue having a state (head, tail, length)=(7, 13, 4), and a second queue having a state (head, tail, length)=(9, 1, 3). The head of the first queue, situated at index 7, stores the index of the second queue element, i.e. 11. The pointer table memory location corresponding to index 11 stores the index of the third queue element, i.e. 3. The memory location corresponding to index 3 stores the index of the queue tail, i.e. 13. The pointer table memory location corresponding to index 13 stores some arbitrary tail value, e.g. hexadecimal FFFF. Similarly, the second queue elements occupy memory locations corresponding to indexes 9, 14, and 1. The index values stored by the second queue elements are 14, 1, and FFFF, respectively.

Separate pointer tables are preferably maintained for the pointer queues and message queues in a queue group controlled by an SQM 54*a-b* (shown in FIG. 2-A). An SQM 54*a-b* capable of supporting both pointer queues and message queues may thus control three memory location pools: a pure pointer table for pointer queues, a data pointer table for the pointers of message queues, and a message buffer pool for the message data corresponding to the pointer table entries. A fourth memory location pool may be assigned implicitly to the pointer table for pointer queues, but the SQM ordinarily would not store data in that memory pool. The data pointer table preferably includes both entries corresponding to stored message data, and shared memory resource queue entries corresponding to free memory locations. The shared memory resource queue entries are controlled by the corresponding SRM 58. The shared memory resource queue may be initialized to contain all the message buffer pool entries assigned to that SQM. Then, on initialization, the entire data pointer table is assigned to the shared memory resource queue, and no entries are assigned to message queues. As elements are en-queued and de-queued to/from message queues, entries in the data pointer table are transferred between message queues and the shared memory resource queue.

FIG. 8 shows the internal structure of a local-state secondary queue manager (SQM) 54*a*, according to an embodiment of the present invention. SQM 54*a* includes an agent-side interface 300 connected to crossbar switch 40 and agents 24 (shown in FIGS. 1 and 2-A). Agent-side interface 300 preferably implements the packet-based bus protocol described in the above-incorporated U.S. patent application Ser. No. 10/423,499, filed Apr. 25, 2003, entitled "On-Chip Packet-Based Interconnections using Repeaters/Routers." Agent-side interface 300 encapsulates data received from the other functional blocks of SQM 54*a* into data packets according to the above-reference packet bus protocol, before transmitting the data to agents 24. Agent-side interface 300 may also strip packet headers from packets received from agents 24 through crossbar switch 40, before transmitting the packet data to the other functional blocks of SQM 54*a*.

A queue state controller 302 is connected to agent-side interface 300. Queue state controller 302 is connected to on-chip queue state storage such as one or more queue state registers 304. A linked-list sequencer 306 is connected to queue state controller 302. A memory controller interface 308 is connected to linked-list sequencer 306 and to memory controller 34 (shown in FIG. 1). A semaphore controller 312 is connected to agent-side interface 300. A software-programmable setup (initialization) controller 314 is connected to the various parts of SQM 54*a*.

Agent-side interface 300 receives agent read/write messages from crossbar switch 40, and transmits responses directly to agents 24. Queue-state controller 302 receives agent messages from agent-side interface 300, and receives and transmits linked-list queue states to/from queue state registers 304. Queue state controller 302 also sends current linked-list queue states to linked-list sequencer 306, and receives updated linked-list queue states from linked-list sequencer 306. Linked-list sequencer 306 sends replies directly to agent-side interface 300, and sends/receives pointers/messages to/from memory controller interface 308. Linked-list sequencer 306 also sends free memory space en-queue and de-queue requests directly to the shared resource manager (SRM) 58 corresponding to SQM 54*a* (shown in FIG. 2-A), and receives free memory addresses from SRM 58 in response to the de-queue requests. Memory controller interface 308 transfers pointers and message between linked-list sequencer 306 and memory controller 34 (shown in FIG. 1). Semaphore controller 312 receives semaphore request messages from agent-side interface 300, wherein each semaphore request message includes an identification of a target queue. In response to a semaphore request message, semaphore controller 312 sends to agent-side interface 300 a reply identifying an agent-settable semaphore indicator for the target queue. The semaphore indicator may be a single-bit advisory indicator. The semaphore indicator is encapsulated in an appropriate packet and transmitted to the requesting agent by agent-side interface 300. The semaphore indicator may be used to implement a queue locking scheme, for example by having agents to check for a queue semaphore's availability before performing an operation on a queue. Setup controller 314 is capable of sending setup configuration parameters to each of the other functional blocks of SQM 54*a*. Such configuration parameters may include initial queue states for all pointer and message queues, the location of a shared resource manager pointer table, the location of a message pool assigned to SQM 54*a*, the location of the pointer table for each pointer queue group controlled by SQM 54*a*, and a maximum length for each queue controlled by SQM 54*a*. In one embodiment, all message queues are initially empty, while some pointer queues may be non-empty.

FIG. 9-A-B illustrate exemplary sequences of steps performed in a write and a read operation, respectively, performed by local-state SQM 54*a* and its associated SRM 58 (shown in FIG. 2-A). In a write operation, as shown in FIG. 9-A, agent-side interface 300 receives a write request packet from crossbar switch 40 (step 400). The write request packet contains an identifier of the target secondary queue, and may include an identifier of the linked-list position for the element to be written. Agent side interface 300 sends the write message encapsulated in the received write request packet to queue state controller 302. Upon receiving the message, queue state controller 302 retrieves the target queue state from queue state registers 304 (step 402). The target queue state is transmitted to linked-list sequencer 306. Linked-list sequencer 306 uses the queue state to determine whether the requested write operation can be performed on the target queue. For example, a requested write operation can be performed only if the target queue is not full. Linked list sequencer 306 then sends an operation status reply (e.g. a write acknowledge message or an error message) to agent-side interface 300, for transmission back to the requesting agent (step 404). The operation status reply indicates whether the requested operation can be performed on the target queue. Agent-side interface 300 encapsulates the operation status reply message in a packet, and sends the reply packet to the requesting agent. Once a write acknowledge message has been sent, no other commands are executed until the current write command has completed.

Agent-side interface 300 then receives a write data packet from the requesting agent through crossbar switch 40, and sends the corresponding write message to queue state controller 302 (step 408). The write data packet contains an identifier of the target linked-list queue. The write data packet may also include an identifier of a linked list position at which the data is to be inserted. Queue state controller 304 retrieves the target queue state from queue state registers 304, and sends the target queue state and the corresponding write message to linked-list sequencer 306 (step 410). Linked-list sequencer 306 sends a request for a free memory address to SRM 58 (shown in FIG. 2-A), and receives the address of a free memory location in response (step 412). The free memory address is preferably received in response to a dequeue request sent to a free-memory pointer linked-list queue controlled by SRM 58.

Linked-list sequencer 306 sends a memory command including the data to be written to memory controller 34 (shown in FIG. 1) through memory controller interface 308 (step 414). The memory command also includes the free memory address received from SRM 58. Linked-list sequencer 306 links the newly-added linked-list element to the existing linked list elements, by sending appropriate linking memory write commands to memory controller 34 through memory controller interface 308 (step 416). If the new linked list element is added at the linked list head, linking the element includes setting the pointer of the newly-added element to the memory address of the previous linked list head. If the new linked list element is added at the linked list tail, linking the element includes changing the pointer value at the previous tail to the address of the free memory location where the new element has been stored. The pointer value for the newly-added element may be some fixed value (e.g. FFFF) marking the linked-list tail. If the new linked list element is added at an internal position in the linked list, linking the element includes setting the pointer of the immediately preceding linked list element to the memory address of the new linked list element, and setting the pointer of the new linked list element to the memory address of the immediately subsequent linked list element. Linking an internal linked list element may require multiple memory access operations, as successive linked list elements are retrieved from memory, starting from the linked list head, in order to determine the memory addresses of the linked list elements immediately before and after the newly added linked list element.

In a step 418, the linked-list state stored in queue state registers 304 is updated. Linked-list sequencer 306 generates an updated queue state (head address, tail address, queue length) reflecting the addition of the new linked-list element, and sends the updated queue state to queue state controller 302 for storage in queue state registers 304. After addition of a new element at the linked list tail, the new linked list state will have a different tail address, and a linked list length incremented by one. In a step 420, SRM 58 removes the free memory location sent to the secondary queue manager from the free memory pointer linked list. Removing the free memory location from the head of the free memory pointer linked list includes updating the head address and linked list length for the free linked list.

In a read operation, as shown in FIG. 9-B, agent-side interface 300 receives a read request packet from crossbar switch 40 (step 430). The read request packet contains an identifier of the target secondary queue, and may include an identified of the linked-list position of the element to be read. Agent side interface 300 sends the received read message to queue state controller 302. Upon receiving the message, queue state controller 302 retrieves the target queue state from queue state registers 304 (step 432). The target queue state is transmitted to linked-list sequencer 306. Linked-list sequencer 306 uses the queue state to determine whether the requested read operation can be performed on the target queue. For example, a requested read operation can be performed only if the target queue is not empty. If the read operation cannot be performed, linked list sequencer 306 sends an error message to agent-side interface 300, for transmission back to the requesting agent.

If the target queue is not empty, SQM Ma performs the requested read operation (step 434). Linked-list sequencer 306 sends a read memory command to memory controller 34 (shown in FIG. 1) through memory controller interface 308. In response, memory controller 34 sends the requested data to memory controller interface 308, which directs the data to linked-list sequencer 306. Linked-list sequencer 306 directs that data to agent-side interface 300, which sends one or more read data packets to the requesting agent (step 436).

Linked-list sequencer 306 re-links the existing linked-list elements, if needed, by sending appropriate linking memory write commands to memory controller 34 through memory controller interface 308 (step 438). If a linked-list element has been removed from the linked-list head, no re-linking is generally needed. If a linked-list element has been removed from the linked-list tail, the pointer of the new tail element may be changed to some fixed value (e.g. FFFF) marking the linked-list tail. If a linked-list element has been removed from an internal position in the linked-list, re-lining the existing linked-list elements includes setting the pointer of the immediately preceding linked list element to the memory address of the immediately subsequent linked list element. Linking an internal linked list element may require multiple memory access operations, as successive linked list elements are retrieved from memory, starting from the linked list head, in order to determine the memory addresses of the linked list elements immediately before and after the newly added linked list element.

In a step 440, the linked-list state stored in queue state registers 304 is updated. Linked-list sequencer 306 generates an updated queue state (head address, tail address, queue length) reflecting the removal of the linked-list element, and sends the updated queue state to queue state controller 302 for storage in queue state registers 304. After removal of an element from the linked list tail, the new linked list state will have a different tail address, and a linked list length decremented by one.

In a step 444, the free-memory pointer linked list controller by SRM 58 (shown in FIG. 2-A) is updated. Linked-list sequencer 306 sends an enqueue request to SRM 58. The enqueue request contains the address of the newly read linked-list element. SRM 58 adds the now-free memory location to the free memory pointer linked list. Adding the free memory location to the tail of the free memory pointer linked list includes updating the tail address and linked list length for the free linked list.

SRM 58 may be organized internally generally as shown in FIG. 8 for SQM 54*a*. In one embodiment, SRM 58 does not include a semaphore controller, the agent-side interface of SRM 58 is connected to a corresponding secondary queue manager rather than a crossbar switch, and the queue state controller and linked-list sequencer of SRM 58 have simpler logic than the queue state controller and linked-list sequencer of an SQM 54*a*. As described above, SRM 58 preferably controls a single pointer linked-list queue, rather than multiple message and/or pointer linked-list queues.

Figure 10:
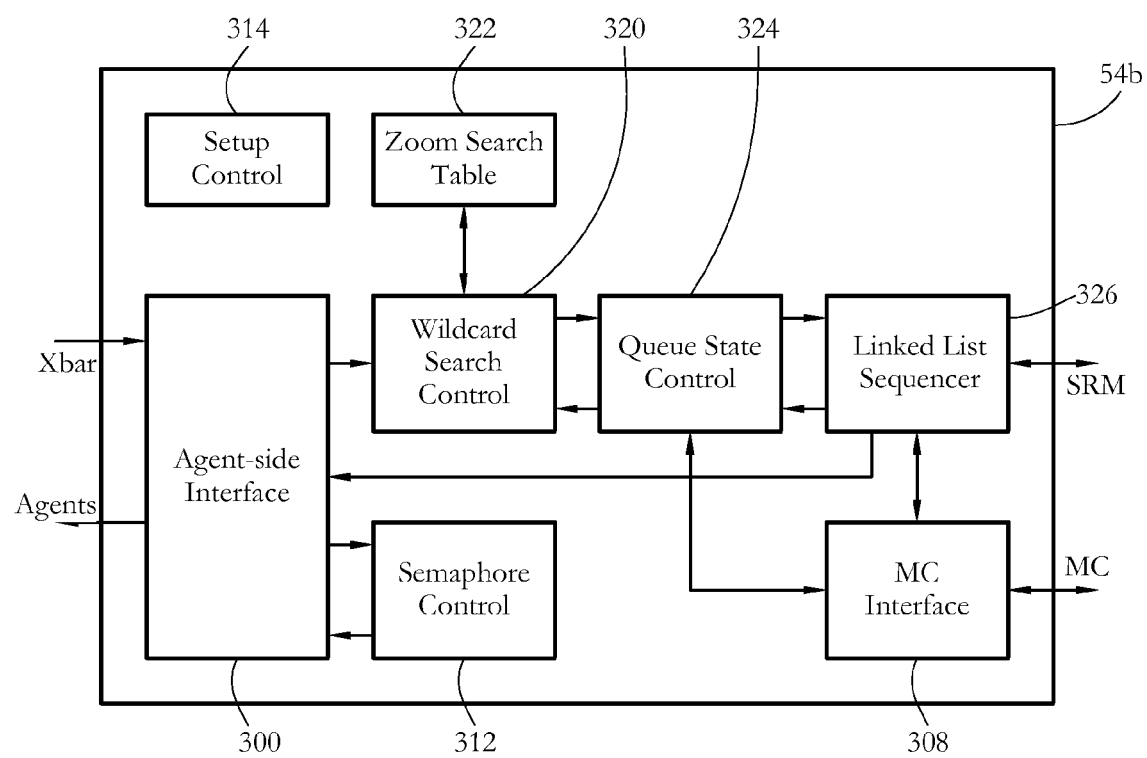
FIG. 10 illustrates schematically an exemplary internal structure of a remote-state secondary (linked-list) queue manager according to an embodiment of the present invention.

FIG. 10 shows the internal structure of a remote-state secondary queue manager (SQM) 54*b*, according to an embodiment of the present invention. SQM 54*b* includes several components described above with reference to FIG. 8, including an agent-side interface 300, memory controller interface 308, semaphore controller 312, and setup controller 314. Setup controller 314 may control the configuration parameters described above with reference to SQM 54*a* (shown in FIG. 8), and additionally parameters such as a maximum cumulative queue length per segment, and maximum space allocated per segment. The per-segment length cap for SQM 54*b* may be used instead of a per-queue length cap used for SQM 54*a*. SQM 54*b* further includes a wildcard search controller 320 connected to agent-side interface 300, a zoom search table 322 connected to wildcard search controller 320, a queue state controller 324 connected to wildcard search controller 320 and memory controller interface 308, and a linked-list sequencer 326 connected to queue state controller 324, agent-side interface 300, and memory controller interface 308.

Wildcard search controller 320 receives wildcard or queue-specific agent read/write messages from agent-side interface 300, transmits queue-specific read/write messages to queue state controller 324, and receives identifiers of served queues from queue state controller 324. Agent write requests are queue-specific. Agent read request may be queue-specific or wildcard requests. Wildcard requests are requests for data from any of a number of queues, e.g. from any queue controlled by SQM 54b. Queue state controller 324 sends current queue states to linked-list sequencer 326, and receives updated queue states from linked-list sequencer 326. Queue state controller 324 also sends requests for queue states to memory controller interface 308, and receives queue states from memory controller interface 308.

Linked-list sequencer 306 receives agent requests and queue states from queue state controller 324, and returns updated queue states to queue state controller 324. Linked-list sequencer 306 sends replies directly to agent-side interface 300, and sends/receives pointers and messages to/from memory interface 308. Linked-list sequencer 306 also sends free memory space en-queue and de-queue requests directly to the shared resource manager (SRM) 58 corresponding to SQM 54b (shown in FIG. 2-A), and receives free memory addresses from SRM 58 in response to the de-queue requests.

FIG. 11-A-B illustrate exemplary sequences of steps performed in a write and read operation, respectively, performed by remote-state SQM 54b and its associated SRM 58 (shown in FIG. 2-A). The remote-state write operation shown in FIG. 11-A shares many of the steps illustrated in FIG. 9-A for a local-state write operation. In a write operation, as shown in FIG. 11-A, agent-side interface 300 receives a write request packet from crossbar switch 40 (step 500). Agent side interface 300 sends the write message encapsulated in the received write request packet to queue state controller 324, through wildcard search controller 320. Upon receiving the write message, queue state controller 324 retrieves the target queue state from memory, by sending a memory read command to memory controller interface 308, and receiving the target queue state from memory controller interface 308 (step 502). The target queue state is transmitted to linked-list sequencer 326. Linked-list sequencer 326 uses the queue state to determine whether the requested write operation can be performed on the target queue. Linked list sequencer 326 sends an operation status reply (e.g. a write acknowledge message) to agent-side interface 300, for transmission back to the requesting agent (step 504). Agent-side interface 300 encapsulates the operation status reply message in a packet, and sends the reply packet to the requesting agent.

Agent-side interface 300 then receives a write data packet from the requesting agent through crossbar switch 40, and sends the corresponding write message to queue state controller 324 through wildcard search controller 320 (step 508). Queue state controller 324 retrieves the target queue state from memory, by sending a memory read command to memory controller interface 308, and receiving the target queue state from memory controller interface 308 (step 510). The target queue state is transmitted to linked-list sequencer 326. Linked-list sequencer 326 sends a request for a free memory address to SRM 58 (shown in FIG. 2-A), and receives the address of a free memory location in response (step 512). The free memory address is preferably received in response to a de-queue request sent to a free-memory pointer linked-list queue controlled by SRM 58.

Linked-list sequencer 326 sends a memory command including the data to be written to memory controller 34 (shown in FIG. 1) through memory controller interface 308 (step 514). The memory command also includes the free memory address received from SRM 58. Linked-list sequencer 326 links the newly-added linked-list element to the existing linked list elements, by sending appropriate linking memory write commands to memory controller 34 through memory controller interface 308 (step 516). In a step 518, the linked-list state stored in memory is updated. Linked-list sequencer 326 generates an updated queue state reflecting the addition of the new linked-list element, and sends the updated queue state to queue state controller 324, which in turn sends the queue state to memory controller interface 308 for storage in memory. In a step 520, SRM 58 removes the free memory location sent to the secondary queue manager from the free memory pointer linked list.

In a read operation, as shown in FIG. 11-B, agent-side interface 300 receives a read request packet from crossbar switch 40 (step 522). Agent side interface 300 sends the received read request message to wildcard search controller 320. The read request may be a queue-specific read request, or a wildcard read request. A queue-specific read request contains an identifier of the target secondary queue, while a wildcard request is a request for data from any one of a number of queues. For example, a wildcard request may be a request for data from any of the queues controlled by SQM 54b. Wildcard search controller 320 determines whether the received read request is a queue-specific or wildcard read request (step 524). If the read request is a wildcard read request, wildcard search controller 320 selects a non-empty queue, and sends a queue-specific read request including an identifier of the selected queue to queue state controller 324 (step 526). Wildcard search controller 324 updates a wildcard queue search table to reflect the performed read operation (step 528). The wildcard queue search table stores data identifying which of the queues controlled by SQM 54b are empty. Wildcard search controller 320 and its operation are described in further detail with reference to FIGS. 12-13.

Upon receiving a read request message, queue state controller 324 retrieves the target queue state from memory, by sending a memory read command to memory controller interface 308, and receiving the target queue state from memory controller interface 308 (step 532). The target queue state is transmitted to linked-list sequencer 326. Linked-list sequencer 326 uses the queue state to determine whether the requested read operation can be performed on the target queue. If the read operation cannot be performed, linked list sequencer 326 sends an error message to agent-side interface 300, for transmission back to the requesting agent.

If the target queue is not empty, SQM 54b performs the requested read operation (step 534). Linked-list sequencer 326 sends a read memory command to memory controller 34 (shown in FIG. 1) through memory controller interface 308. In response, memory controller 34 sends the requested data to memory controller interface 308, which directs the data to linked-list sequencer 326. Linked-list sequencer 326 directs that data to agent-side interface 300, which sends one or more read data packets to the requesting agent (step 536).

Linked-list sequencer 326 re-links the existing linked-list elements, if needed, by sending appropriate linking memory write commands to memory controller 34 through memory controller interface 308 (step 538). In a step 540, the linked-list state stored in memory is updated. Linked-list sequencer 326 generates an updated queue state reflecting the addition of the new linked-list element, and sends the updated queue state to queue state controller 324, which in turn sends the queue state to memory controller interface 308 for storage in memory. In a step 544, the free-memory pointer linked list controller by SRM 58 (shown in FIG. 2-A) is updated. Linked-list sequencer 326 sends an enqueue request containing the address of the newly read linked-list element to SRM 58. SRM 58 adds the now-free memory location to the free memory pointer linked list.

A wildcard search process according to an embodiment of the present invention can be better understood by considering an exemplary queue hierarchy tree. In an exemplary embodiment, each SQM 54b controls a segment of 64 k linked-list queues. Each segment of 64 k queues is divided into 2 k queue sets of 32 queues each. Each queue set has an associated queue set count equal to the number of non-empty (valid) queues in the set. The queue sets are grouped into 128 queue supersets of 16 queue sets each. A superset includes 512 queues. The above queue groupings are used to facilitate rapid wildcard searching of the 64 k queues controlled by SQM 54b, as described below. The wildcard search process generates an identity of a non-empty queue selected from the 64 k queues controlled by SQM 54b.

Figure 12:
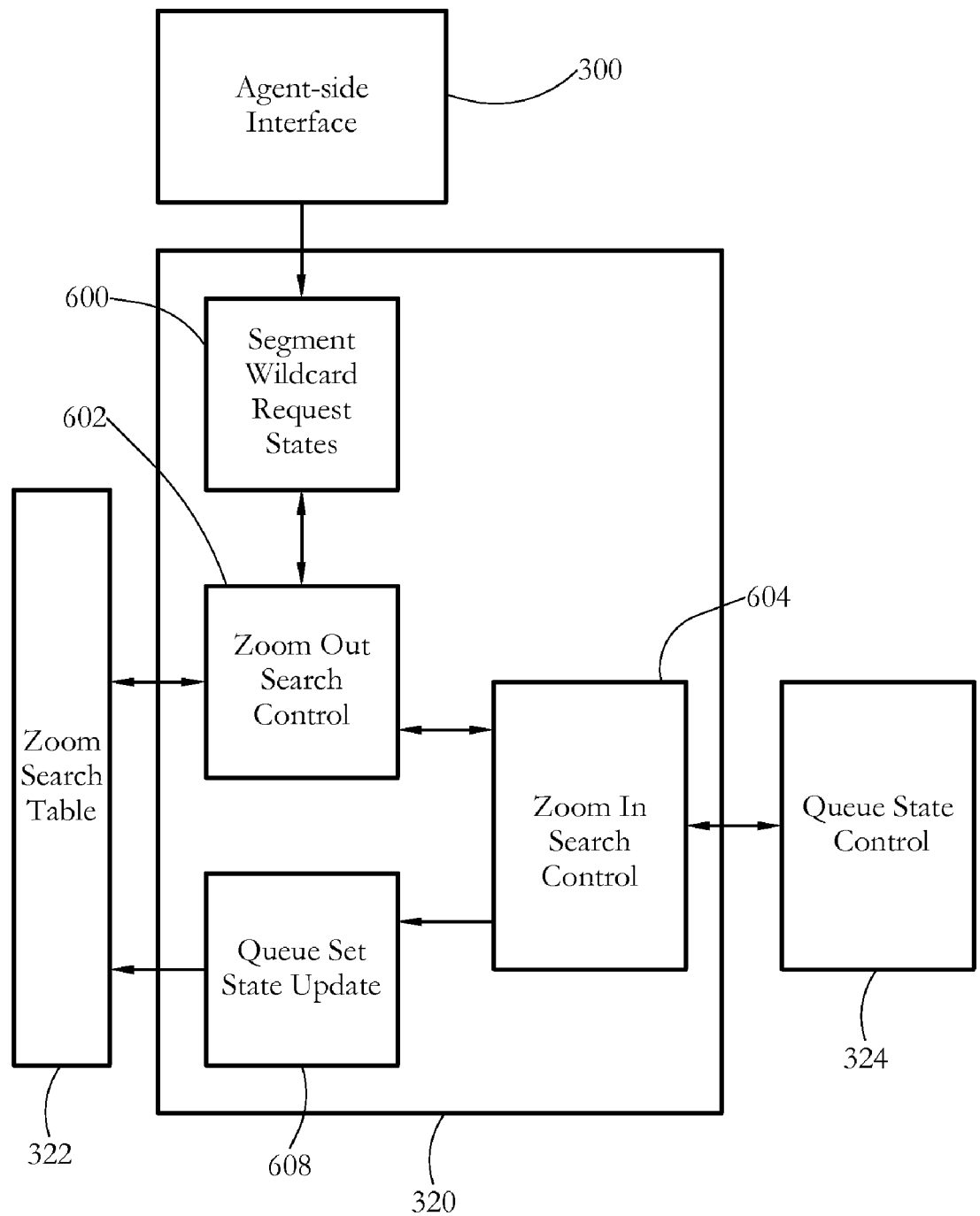
FIG. 12 illustrates schematically an exemplary internal structure of a wildcard search controller according to an embodiment of the present invention.

FIG. 12 shows the internal structure of wildcard search controller 320 according to an embodiment of the present invention. Wildcard search controller 320 includes a segment wildcard request state storage unit 600 connected to agent-side interface 300. Segment wildcard request state storage unit 600 stores an identity of a last-wildcard-serviced queue in the 64 k-queue segment controlled by SQM 54b. A zoom-out search controller 602 is connected to segment wildcard request state storage unit 600 and zoom search table 322. Zoom-out search controller 602 generates an identity of a non-empty, 32-queue set subsequent to or including the last-serviced queue. A zoom-in search controller 604 is connected to zoom-out search controller 602 and queue state controller 324. Zoom-in search controller 602 generates an identity of a non-empty queue to be serviced by queue state controller 324. A queue set state update controller 608 is connected to zoom search table 322 and zoom-in search controller 604. Queue set state update controller 608 updates the queue set states stored in zoom search table 322.

Segment wildcard request state storage unit 600 receives a wildcard search request from agent-side interface 300, transmits an identity of a current last-wildcard-serviced queue to zoom-out search controller 602, and receives an identity of a new last-wildcard-serviced (just-serviced) queue from zoom-out search controller 602. Zoom out search controller 602 receives queue set states for the states in a 512-queue (16-set) superset from zoom search table 322. A queue set state identifies whether the set has any non-empty queues, for example by identifying the number of non-empty queues in that set. Zoom-out search controller 602 sends a non-empty target queue set identifier (e.g. queue set number) and an identifier of the current last-wildcard-serviced queue to zoom-in search controller 604. Zoom-in search controller 604 sequentially sends target queue identifiers to queue state controller 324, and receives target queue states from queue state controller 324. Zoom-in search controller 604 further sends a just-serviced queue identifier to queue set state update controller 608. Queue set state update controller sends updated queue set states to zoom search table 322.

Figure 13:
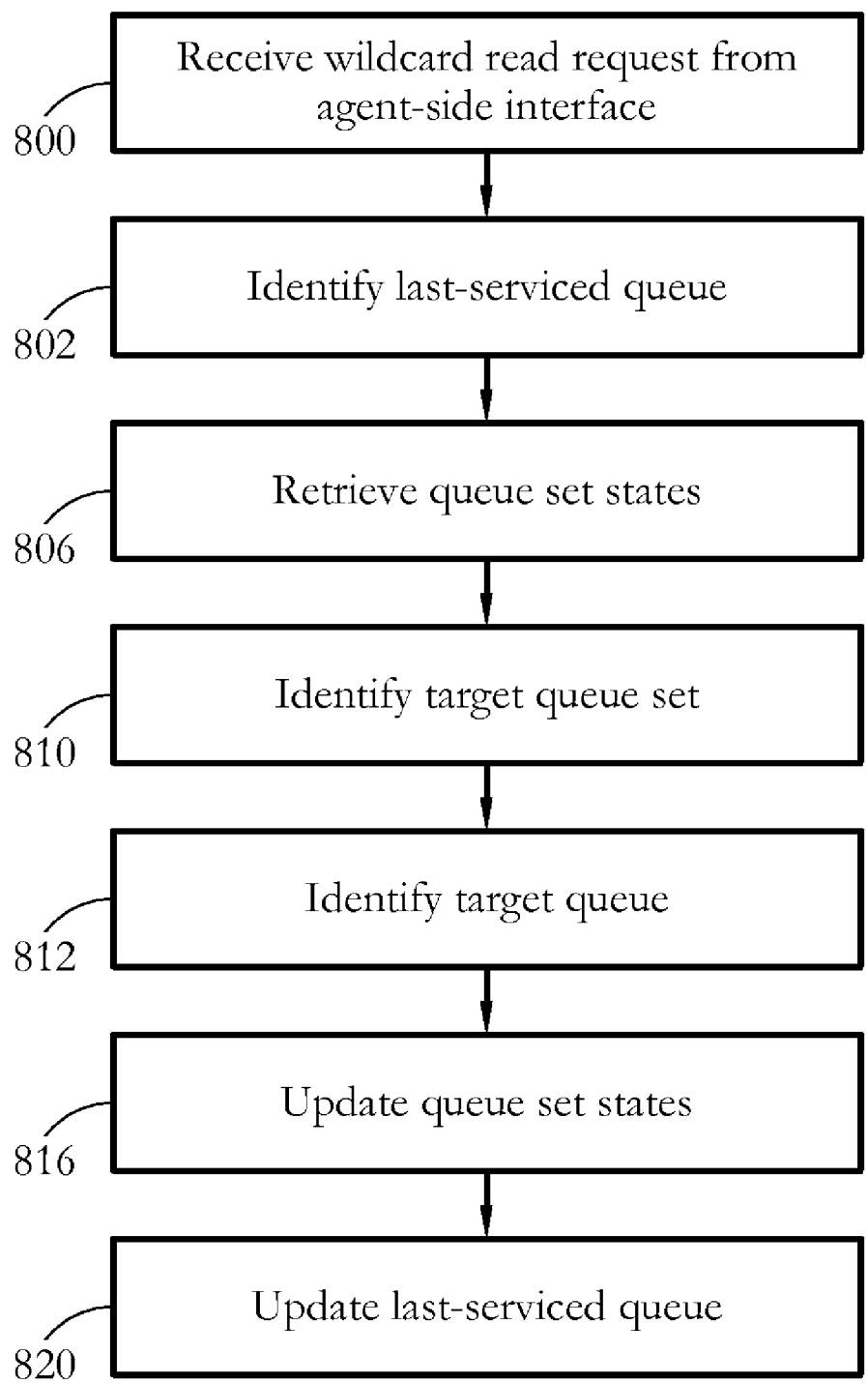
FIG. 13 shows a sequence of steps performed in identifying a target queue in response to a wildcard (non-queue-specific) read request, according to an embodiment of the present invention.

The operation of wildcard search controller 320 according to one embodiment can be better understood with reference to FIG. 13. In a step 800, segment wildcard request state storage unit 600 receives a wildcard search request from agent-side interface 300. Segment wildcard request storage unit 600 retrieves from an on-chip register an identifier of a last-wildcard-serviced (last-searched) queue, and transmits the identifier to zoom-out search controller 602 (step 802). The last-searched queue is the queue accessed in response to the immediately previous wildcard read request. Wildcard search controller 320 implements a round-robin search policy, such that its search for a non-empty queue starts at the queue following the previously-accessed queue. For example, if queue #8 was the queue accessed in the immediately-previous wildcard read operation, then wildcard search controller 320 starts its search for a non-empty queue at queue #9.

Zoom-out search controller 602 sends a queue set state read request to zoom search table 322, and receives from zoom search table 322 the queue set states for the queue sets in the 512-queue superset that includes the first queue to be searched (step 806). The queue set states for the queues in a superset are preferably 16 6-bit numbers (i.e. a 96-bit value), wherein each G-bit value identifies a number of non-empty queues in its corresponding 32-queue set. Zoom-out search controller 602 identifies a target queue set, and sends an identifier of the target queue set to zoom-in search controller 604 (step 810). The target queue set is the first non-empty queue set that includes or follows the first queue to be searched. If the last-searched queue is not the last queue in its set, the target queue set is the set containing the last-searched queue. Zoom-out search controller 602 sends to zoom-in search controller 604 an identifier of the last-serviced queue if the target queue set includes the last-searched queue.

Zoom-in search controller 604 identifies the first non-empty queue following the last-serviced queue by sequentially retrieving queue states from memory through queue state controller 324 (step 812). Zoom-in search controller 604 sequentially requests from queue state controller 324 a number of queue states. The sequential retrieval process begins with the queue following the last-serviced queue, unless the last-serviced queue is the last non-empty queue in its set. If the last-serviced queue is the last non-empty queue in its set, then queue states are not retrieved for the remaining empty queues in the set or for queues in subsequent empty sets. If the immediately-subsequent queue set is non-empty, the sequential retrieval process starts with the first queues of that queue set. If the immediately subsequent queue set is empty, the sequential retrieval process begins with the first queue of the first subsequent non-empty queue set. A target queue is identified when queue state controller 324 returns a non-empty queue state to zoom-in search controller 604. If no valid (non-empty) queue is identified in the target set, zoom-in search controller 604 may request a new target set from zoom-out search controller 602. After zoom-out search controller 602 identifies a new, non-empty target set subsequent to the previous target set, zoom-in search controller 604 identifies a target queue in the new target set as described above.

If the just-serviced queue became empty as a result of the latest read request (wildcard read or queue-specific read), zoom-in search controller 604 sends an identifier of the last-serviced queue to queue set state update controller 608, which in turn updates the corresponding queue set state stored in zoom search table 322 by decrementing the number of non-empty queues in that set by one (step 816). Following execution of a wildcard read request, zoom-in search controller 604 sends an identifier of the last-serviced queue to segment wildcard request states storage unit 600 through zoom-out search controller 602. Segment wildcard request states storage unit 600 updates its record of the last queue serviced in response to a wildcard read request (step 820).

Wildcard search controller 320 may also update the queue set states stored in zoom search table 322 in response to received write commands and queue-specific read commands. When a write or queue-specific read command changes the full/empty status of an accessed queue, wildcard search controller 320 increments or decrements the stored number of non-empty queues associated with the queue set to which the accessed queue belongs.

The preferred hardware-implemented linked-list control systems and methods described above allow relatively fast data transfer between multiple agents, while allowing efficient memory utilization and allocation, and a relatively low memory latency. A large number of variable-size queues can be handled without requiring the inefficient allocation of large amounts of memory space per queue. The preferred queue management switch including an integrated crossbar switch as described above allows a reduction in the chip space taken up by agent interconnections. Efficient memory utilization and access are also facilitated by the use of a free-memory-address linked-list queue shared by multiple message linked-list queues. The preferred wildcard search systems and methods allow speeding up the execution of wildcard search commands, by reducing the number of queue states retrieved from memory for each search. In a system having a large number of empty queues, sequentially retrieving all queue states may lead to wastefully retrieving many empty queue states until a non-empty queue is found.

A data processing system including queue managers as described above may be designed and built using known and available hardware design tools. A hardware description language (e.g. Verilog or VHDL) of the system may be generated and tested, and implemented as an application-specific integrated circuit (ASIC) or using a field-programmable gate array (FPGA). Hardware design tools and methods are known in the art.

It will be clear to one skilled in the art that the above embodiments may be altered in many ways without departing from the scope of the invention. Accordingly, the scope of the invention should be determined by the following claims and their legal equivalents.

What is claimed is:

1. An integrated circuit comprising a hardware wildcard search controller for generating a queue-specific read request from a wildcard read request, the queue-specific read request comprising an identifier of a non-empty target linked-list queue selected from a linked-list queue segment comprising a plurality of linked-list queue sets, each linked-list queue set comprising a plurality of linked-list queues, the wildcard search controller comprising:
   a segment request state controller configured to:
      receive an agent wildcard read request,
      identify a search-start linked-list queue,
      transmit an identifier of the search start linked-list queue,
      receive an identifier of the non-empty target linked-list queue,
      assign the non-empty target linked-list queue to be an updated search start linked-list queue for a subsequent wildcard read request;
   a zoom-out search controller connected to the segment request state controller, configured to:
      receive the identifier of the search start linked-list queue from the segment request state controller,
      employ the identifier of the search start linked-list queue to identify a search target linked-list queue set, and
      transmit an identifier of the search target linked-list queue set; and
   a zoom-in search controller connected to the zoom-out search controller, configured to:
      receive the identifier of the search target linked-list queue set,
      identify the non-empty target linked-list queue by retrieving linked-list queue states for linked-list queues belonging to the search target linked-list queue set, and
      transmit the identifier of the non-empty target linked-list queue.

2. The integrated circuit of claim 1, wherein identifying the search target linked-list queue set comprises retrieving linked-list queue set states for the plurality of linked-list queue sets, a state of a linked-list queue set identifying a number of non-empty linked-list queues in the linked-list queue set.

3. An integrated circuit comprising a wildcard search controller for generating a queue-specific read request from a wildcard read request received over an agent-side interface of the wildcard search controller, the queue-specific read request comprising an identifier of a non-empty target linked-list queue selected from a segment comprising a plurality of linked-list queues, the wildcard search controller comprising:
   a zoom-out search controller for generating a search target linked-list queue set identifier in response to receipt of the wildcard read request; and
   a zoom-in search controller connected to the zoom-out search controller, for receiving the search target linked-list queue set identifier and generating the identifier of the non-empty target linked-list queue by retrieving linked-list queue states for linked-list queues belonging to the search target linked-list queue set.

4. An integrated circuit comprising a wildcard search controller for generating a queue-specific read request from a wildcard read request received over an agent-side interface of the wildcard search controller, the queue-specific read request comprising an identifier of a non-empty target linked-list queue selected from a segment comprising a plurality of linked-list queues, the wildcard search controller comprising:
   means for generating a search target linked-list queue set identifier in response to receipt of the wildcard read request; and
   means for generating the identifier of the non-empty target linked-list queue by retrieving linked-list queue states for linked-list queues belonging to the search target linked-list queue set.

5. A wildcard read method for generating a linked-list queue-specific read request at a wildcard search controller from a wildcard read request received over an agent-side interface of the wildcard search controller, the wildcard search controller forming part of an integrated circuit, the linked-list queue-specific read request comprising an identifier of a non-empty target linked-list queue selected from a segment comprising a plurality of linked-list queues, the wildcard read method comprising:
   generating a search target linked-list queue set identifier in response to receipt of the wildcard read request; and
   generating the identifier of the non-empty target linked-list queue by retrieving linked-list queue states for linked-list queues belonging to the search target linked-list queue set.

6. The method of claim 5, further comprising performing a read operation on the non-empty target linked-list queue.

7. An integrated circuit comprising a wildcard search controller for generating a queue-specific read request from a wildcard read request received over an agent-side interface of the wildcard search controller, the queue-specific read request comprising an identifier of a non-empty target queue selected from a segment comprising a plurality of queues, the wildcard search controller comprising:

a zoom-out search controller for generating a search target queue set identifier in response to receipt of the wildcard read request; and a zoom-in search controller connected to the zoom-out search controller, for receiving the search target queue set identifier and generating the identifier of the non-empty target queue by retrieving queue states for queues belonging to the search target queue set.

* * * * *

UNITED STATES PATENT AND TRADEMARK OFFICE
CERTIFICATE OF CORRECTION

| | |
|---|---|
| PATENT NO. | : 7,774,374 B1 |
| APPLICATION NO. | : 11/617716 |
| DATED | : August 10, 2010 |
| INVENTOR(S) | : Govind Kizhepat et al. |

It is certified that error appears in the above-identified patent and that said Letters Patent is hereby corrected as shown below:

In column 20, line 16, delete "G-bit" and insert -- 6-bit --, therefor.

Signed and Sealed this
Fourth Day of January, 2011

David J. Kappos
*Director of the United States Patent and Trademark Office*